(12) United States Patent
Lynaugh et al.

(10) Patent No.: US 8,847,116 B2
(45) Date of Patent: Sep. 30, 2014

(54) WIRE FEEDER WITH INTERCHANGEABLE ADAPTOR CARTRIDGES

(75) Inventors: Ryan T. Lynaugh, Cornish, NH (US); Thomas J. Wermert, St. Louis, MO (US)

(73) Assignee: Victor Equipment Company, Denton, TX (US)

( * ) Notice: Subject to any disclaimer, the term of this patent is extended or adjusted under 35 U.S.C. 154(b) by 1508 days.

(21) Appl. No.: 11/451,068

(22) Filed: Jun. 12, 2006

(65) Prior Publication Data

US 2007/0284352 A1    Dec. 13, 2007

(51) Int. Cl.
B23K 9/32    (2006.01)

(52) U.S. Cl.
CPC ..................... B23K 9/323 (2013.01)
USPC ..................... 219/137.63; 439/339

(58) Field of Classification Search
USPC ......... 219/137.1, 137.2, 137.63, 137.7, 137.9
See application file for complete search history.

(56) References Cited

U.S. PATENT DOCUMENTS

| | | | |
|---|---|---|---|
| 4,665,300 A | 5/1987 | Bellefleur | |
| 5,410,126 A | 4/1995 | Miller et al. | |
| 6,150,632 A * | 11/2000 | Fisher | 219/137.71 |
| 6,225,596 B1 | 5/2001 | Chandler et al. | |
| 6,479,795 B1 | 11/2002 | Albrecht et al. | |
| 6,596,972 B1 * | 7/2003 | Di Novo et al. | 219/137.9 |
| 6,705,563 B2 | 3/2004 | Luo et al. | |
| 6,786,752 B1 * | 9/2004 | Kerekes et al. | 439/339 |
| 6,870,131 B2 | 3/2005 | Achtner et al. | |
| 6,933,465 B2 | 8/2005 | Bankstahl et al. | |
| 6,977,358 B2 | 12/2005 | Albrecht et al. | |
| 2003/0098383 A1 * | 5/2003 | Luo et al. | 242/559 |
| 2004/0140295 A1 * | 7/2004 | Herres | 219/121.5 |
| 2005/0000946 A1 * | 1/2005 | Albrecht et al. | 219/74 |
| 2005/0199606 A1 * | 9/2005 | Enyedy | 219/137.7 |
| 2005/0252889 A1 | 11/2005 | Stanzel et al. | |
| 2005/0252890 A1 | 11/2005 | Stanzel et al. | |
| 2005/0252899 A1 | 11/2005 | Stanzel et al. | |
| 2005/0258155 A1 | 11/2005 | DeYoung | |

FOREIGN PATENT DOCUMENTS

| | | |
|---|---|---|
| DE | 79 27 138 | 3/1981 |
| DE | 83 20 169 | 11/1983 |
| WO | WO 01/00364 | 1/2001 |

* cited by examiner

Primary Examiner — Brian Jennison
(74) Attorney, Agent, or Firm — Brinks Gilson & Lione

(57) ABSTRACT

A wire feeder with an integrated adaptor cartridge is provided. The adaptor cartridge comprises a cartridge body interchangeably mounted to the wire feeder for mechanical, welding current, and control signal connections. The adaptor cartridge further comprises an adaptor fitting for establishing the mechanical and welding current connections, and a control signal connector for establishing the control signal connection. The adaptor cartridge is preferably recessed within a housing of the wire feeder to protect the adaptor cartridge. A set of such adaptor cartridges is also provided for providing mechanical, welding current, and control signal connections for a respective one of the welding apparatuses to the wire feeder. Therefore, a single wire feeder can work with a set of welding apparatuses by selecting a suitable adaptor cartridge from the set of adaptor cartridges.

30 Claims, 18 Drawing Sheets

US 8,847,116 B2

WIRE FEEDER WITH INTERCHANGEABLE ADAPTOR CARTRIDGES

FIELD

The present disclosure relates generally to the art of welding, and more particularly to wire feeders and devices for connecting welding apparatuses, such as welding torches, to wire feeders.

BACKGROUND

The statements in this section merely provide background information related to the present disclosure and may not constitute prior art.

A wire feeder is generally used in the art of gas metal arc welding (GMAW), sometimes referred to by its subtypes, metal inert gas (MIG) welding or metal active gas (MAG) welding. GMAW is a semi-automatic or automatic arc welding process in which a consumable welding wire (or wire electrode) and a shield gas are continuously fed through a welding apparatus, such as a welding torch, to a workpiece, where an arc welding process is conducted. The wire feeder is connected to the welding apparatus to continuously supply the welding wire from a wire spool of the wire feeder to the welding apparatus.

A power source supplies a welding current through the wire feeder to the welding apparatus. The workpiece is connected to the power source so that the power source, the wire feeder, the welding apparatus, and the workpiece together establish a welding circuit. Accordingly, the welding wire that passes through the welding apparatus is a part of the welding circuit. An electrical arc is thus generated across a gap between the welding wire and the workpiece to melt the welding wire, which then becomes the weld deposit.

The shield gas is supplied from an external shield gas source through the wire feeder to the welding apparatus and is directed to the workpiece. The shield gas surrounds the portion of the welding wire that exits the welding apparatus to protect the welding area from atmospheric gases, which can cause fusion defects, porosity and weld metal embrittlement when in contact with the welding wire, the arc, or the welding metal.

Generally, a wire feeder from one manufacturer is tailored for a specific type of welding apparatus from the same manufacturer. The welding apparatus includes a gas passage and a conduit for passage of the welding wire, which are in communication with counterpart passages in the wire feeder. Accordingly, a wire feeder from one manufacturer is not directly compatible with a welding apparatus from another manufacturer, given the different geometric and electrical configurations of the welding apparatuses among different manufacturers. Therefore, since the welding apparatus and the wire feeder operate together, downtime often occurs when one of them is out of service and an available welding apparatus or wire feeder is not compatible with the wire feeder or the welding apparatus that is working. Moreover, adapting a welding apparatus from one manufacturer with a wire feeder from another manufacturer is often cumbersome and requires significant manual labor to properly maintain each of the gas and electrical connections.

SUMMARY

In one preferred form, an adaptor cartridge for connecting a welding apparatus to a wire feeder is provided. The adaptor cartridge comprises a cartridge body interchangeably mounted to the wire feeder, wherein the cartridge body is adapted for mechanical, welding current, and control signal connections.

In another form, an adaptor cartridge for use in connecting a welding apparatus to a wire feeder is provided. The adaptor cartridge comprises a cartridge body, an adaptor fitting disposed in the cartridge body, and a control signal connector disposed in the cartridge body.

In yet another form, a set of adaptor cartridges for connecting a set of welding apparatuses, such as welding guns, to a wire feeder is provided. The set of adaptor cartridges each have a cartridge body adapted to provide mechanical, welding current, and control signal connections for a respective one of the welding apparatuses to the wire feeder.

In still another form, a wire feeder is provided that comprises a housing, a wire feeder unit disposed within the housing, and an adaptor cartridge interchangeably mounted to the housing of the wire feeder. The adaptor cartridge provides mechanical, welding current, and control signal connections for a welding apparatus, such as a welding gun, to the wire feeder.

In another form, a wire feeder is provided that comprises a housing defining an outer periphery and an adaptor cartridge interchangeably mounted to the housing. The adaptor cartridge is recessed within the outer periphery of the housing and is adapted for mechanical, welding current, and control signal connections for a welding apparatus, such as a welding gun, to the wire feeder.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
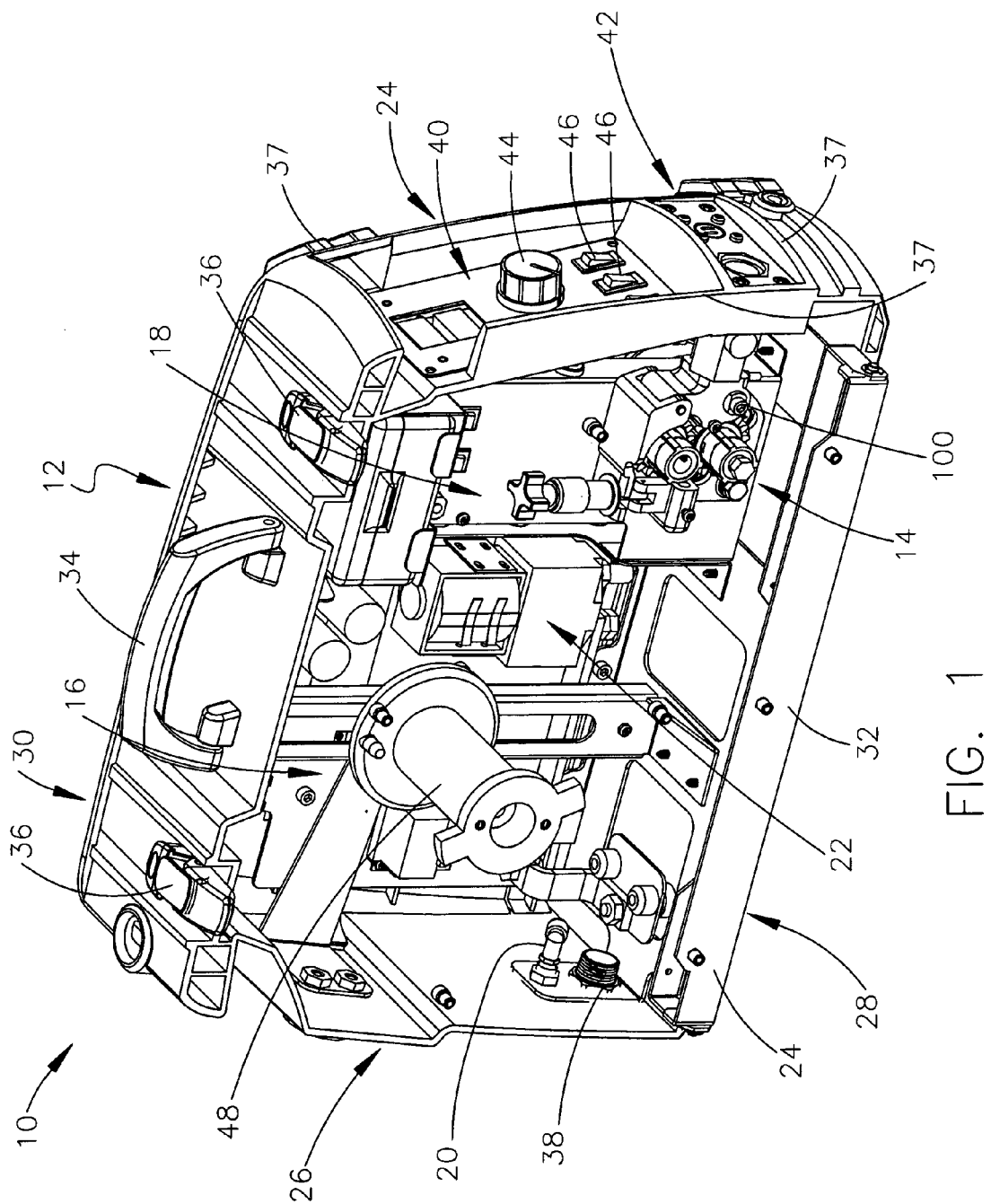
FIG. 1 is a perspective view of a wire feeder with an integrated adaptor cartridge constructed in accordance with the teachings of the present disclosure, wherein a cover of the wire feeder is removed to illustrate components inside the wire feeder.

The following description is merely exemplary in nature and is not intended to limit the present disclosure, application, or uses. It should be understood that throughout the drawings, corresponding reference numerals indicate like or corresponding parts and features.

Figure 2:
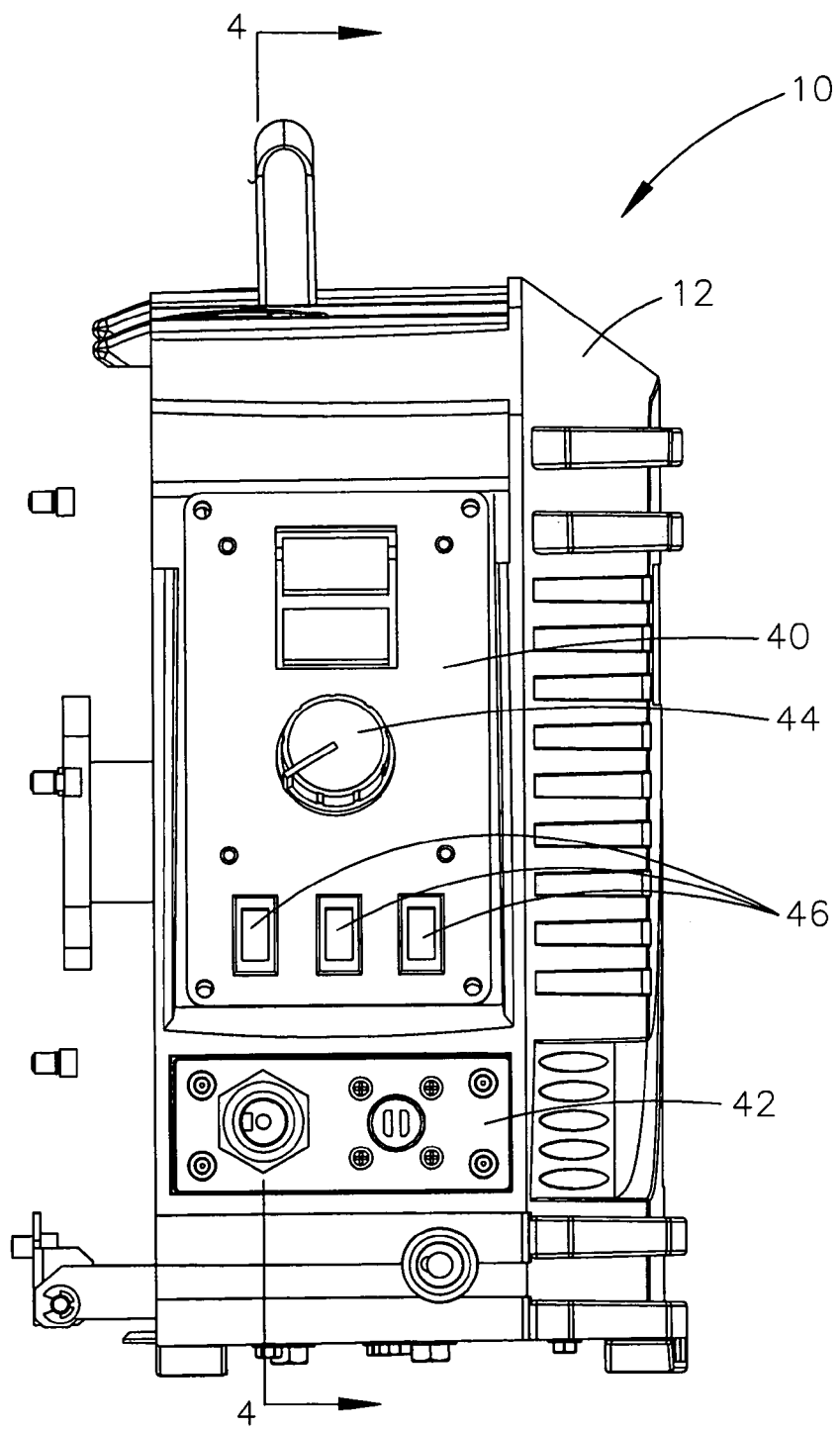
FIG. 2 is a front view of the wire feeder and adaptor cartridge in accordance with the teachings of the present disclosure.

Referring to FIGS. 1 and 2, a wire feeder in accordance with the teachings of the present disclosure is illustrated and generally indicated by reference numeral 10. The wire feeder 10 is of a portable type and comprises a housing 12 for receiving therein a variety of wire feeder components, including, but not limited to, a wire drive assembly 14, a wire spool assembly 16, a circuit board assembly 18, and a contactor assembly 22.

The housing 12 includes a front portion 24, a rear portion 26, a bottom portion 28, a top portion 30 and a cover (not shown) preferably pivotable about a hinge 32 disposed along an edge of the bottom portion 28. A handle 34 is provided along the top portion 30 to allow an operator to transport the wire feeder 10 with relative ease. Additionally, a pair of latches 36 are provided along the top portion 30 for locking the cover in place. Accordingly, the movable cover facilitates access to the various components inside the housing 12.

A gas valve 20 and a power cable connection 38 are provided at the rear portion 26 for connecting the wire feeder 10 to an outside shield gas source (not shown) and an outside power source (not shown), respectively. The gas valve 20 controls the "on/off" flow of shield gas delivered from the shield gas source to a gas hose (not shown) inside the wire feeder 10.

As further shown, a control panel 40 and an adaptor cartridge 42 are provided at the front portion 24. The control panel 40 includes a control knob 44 and switches 46 for allowing an operator to turn on/off the wire feeder 10 and to set up desired operating conditions, such as wire feed speed, arc voltage and modes (constant voltage or constant current), among others. The adaptor cartridge 42 is configured to establish mechanical, welding current, and control signal connections between a specific type of welding apparatus, such as a welding gun, and the wire feeder 10. The specific structure of the adaptor cartridge 42, along with multiple variants and thus sets of adaptor cartridges configured for using different welding apparatuses with the same wire feeder 10, are described in greater detail below.

Figure 3:
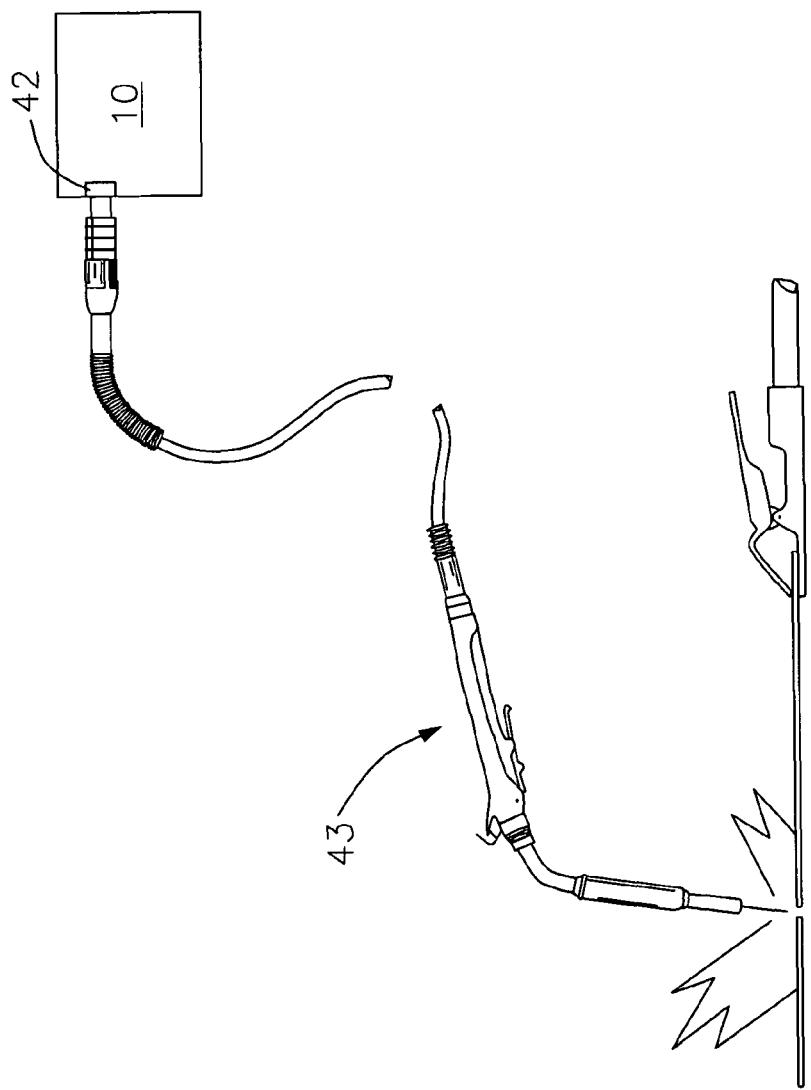
FIG. 3 is a side view of a welding apparatus, and more specifically a MIG welding gun, intended for operation with the wire feeder and adaptor cartridge in accordance with the teachings of the present disclosure.

Referring briefly to FIG. 3, an exemplary welding apparatus in the form of a MIG (Metal Inert Gas) welding gun is illustrated and generally indicated by reference numeral 43. The MIG welding gun 43 may be of a type from any number of manufacturers, including by way of example, TWECO®, MILLER®, LINCOLN®, and a European style welding gun. The MIG welding gun 43 is connected to the wire feeder 10 by the adaptor cartridge 42, which are illustrated in schematic/block form for purposes of clarity. Advantageously, the adaptor cartridge 42 is interchangeably mounted to the wire feeder 10 such that different adaptor cartridges, examples of which are described in greater detail below, are used with different types of welding apparatuses while using a single wire feeder 10.

Figure 5:
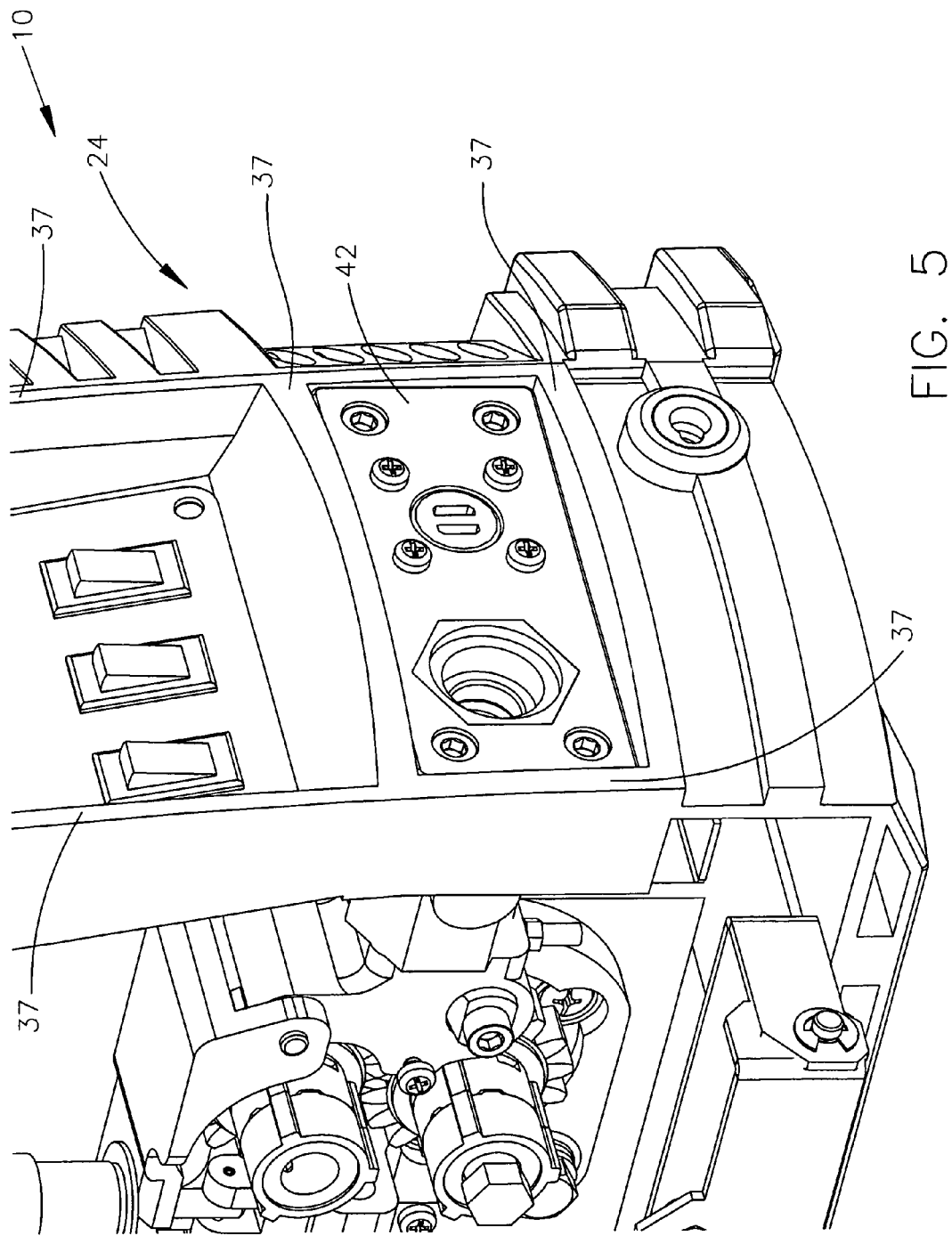
FIG. 5 is an enlarged perspective view of the adaptor cartridge mounted to a housing of the wire feeder in accordance with the teachings of the present disclosure.

Referring back to FIGS. 1 and 2, and also to FIG. 5, the front portion 24 of the housing 12 comprises an outer periphery 37, behind which a number of components of the wire feeder 10 are recessed in order to reduce the likelihood of damage during operation and transport. More specifically, the adaptor cartridge 42 is advantageously recessed within the outer periphery 37 of the housing 12 as shown. As used herein, the term "outer periphery" shall be construed to mean a single surface, or a combination the outermost surfaces as illustrated herein, of the housing 12 that would be more likely to come into contact with an object from the outside environment. As the adaptor cartridge 42 is "recessed," the outer periphery 37 is more likely to come into contact with the object(s) from the outside environment rather than the adaptor cartridge 42 itself, and thus the outer periphery 37 reduces the likelihood that the recessed components, e.g., the adaptor cartridge 42, would be damaged from such contact.

As further shown in FIG. 1, the wire spool assembly 16 includes a hub 48 and a wire spool (not shown) mounted on the hub 48 for winding and supporting a welding wire (not shown). The welding wire is continuously driven to the wire drive assembly 14, through the adaptor cartridge 42, and to the welding apparatus.

The contactor assembly 22 is a power delivery device between the outside power supply and the welding apparatus. The contactor assembly 22 controls the "on/off" flow of a welding current from the outside power source. When the contactor assembly 22 is in an "open" position, the welding wire is electrically "cold," wherein the wire does not carry any welding current. When the contactor assembly 22 is in a "closed" position, the welding wire is electrically "hot," and thus carries welding current.

The circuit board assembly 18 comprises a variety of control circuits (not shown) for controlling the operation of the other wire feeder assemblies and the welding apparatus. These control circuits, which may include wire speed control circuit, voltage sensing control circuit, input circuit breaker, among others, are connected to the control knob 44 and/or the switches 46 disposed at the control panel 40 to allow proper setting thereof by an operator.

Figure 4:
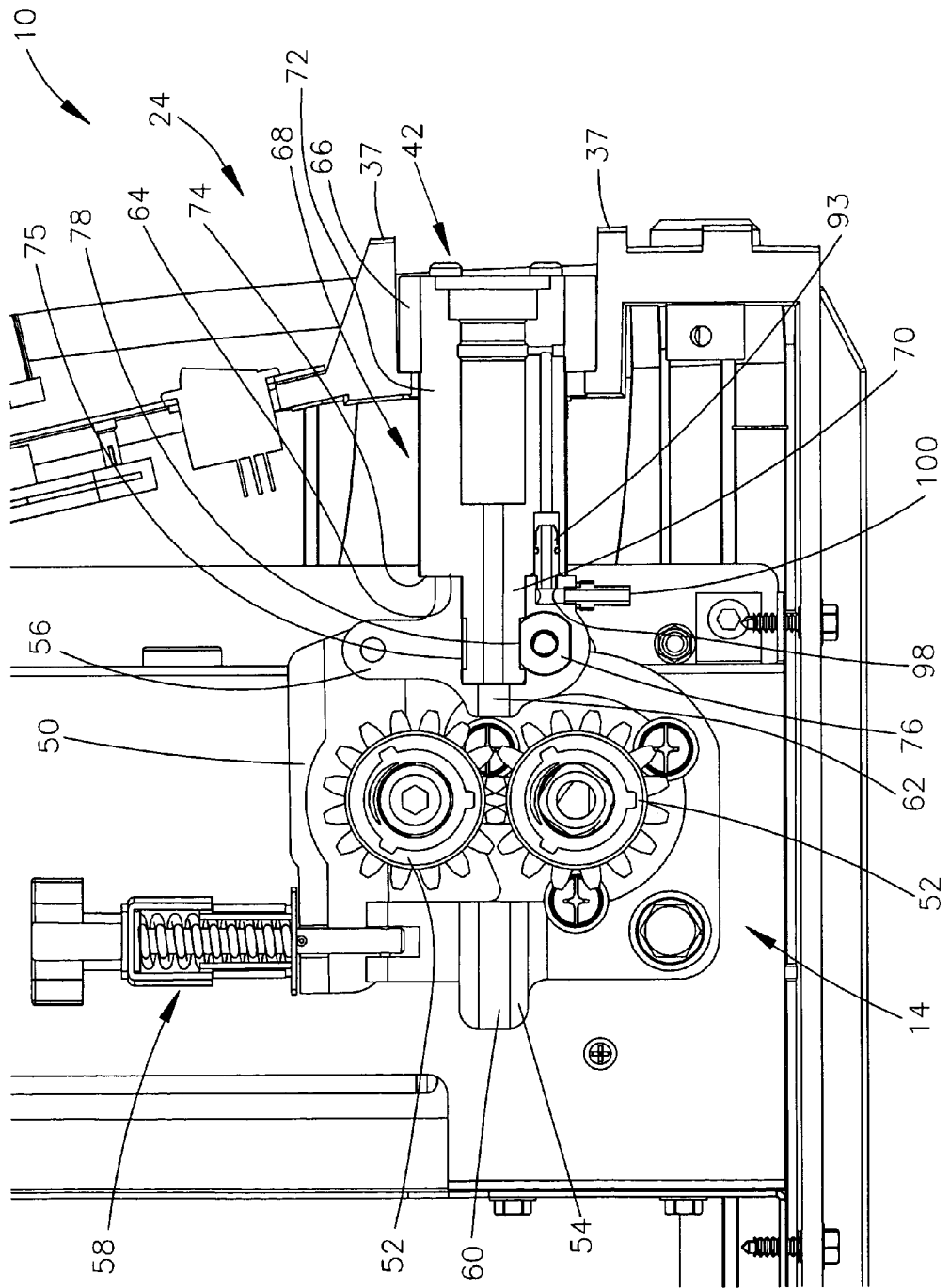
FIG. 4 is a side cross-sectional view, taken along line 4-4 of FIG. 2, illustrating connections between the adaptor cartridge and various components of the wire feeder in accordance with the teachings of the present disclosure.

Referring now to FIG. 4 in conjunction with FIG. 1, the wire drive assembly 14 includes a feedhead 50, a pair of feed rolls 52, a wire input guide 54, a feedplate 56, and a spring tension device 58. The feed rolls 52 are mounted to the feedhead 50 and aligned in an up-and-down arrangement to form a gap (not shown) therebetween. The wire input guide 54 is provided rearwardly of the feed rolls 52 and has a channel 60 aligned with the gap, through which the welding wire (not shown) is fed.

The feedplate 56 is mounted forwardly of the feedhead 50, and defines a channel 62 aligned with the channel 60 of the wire input guide 54 and the gap. The welding wire is driven by the feed rolls 52 from the wire spool, through the channel 60 of the wire input guide 54, the gap, the channel 62 of the feedplate 56, and enters the adaptor cartridge 42.

The channel 60 of the wire input guide 54 and the channel 62 of the feedplate 56 are preferably in the form of a bore with a diameter larger than the outside diameter of any of the welding wires available to or suitable for the wire feeder 10. Therefore, any available welding wires can be freely transferred within the channels 60 and 62 without the need to modify the wire input guide 54 and the feedplate 56. The gap between the feed rolls 52 can be adjusted by the spring tension device 58 so that a proper driving force is applied by the feed rolls 52 onto a variety of sizes of welding wire. Additionally, the feedplate 56 further includes an end face 64 to properly position the adaptor cartridge 42 in the longitudinal direction as shown, which is described in greater detail below.

Referring now to FIGS. 6 through 12, the adaptor cartridge 42 in one form of the present disclosure comprises a cartridge body 66, an adaptor fitting 68 disposed in the cartridge body 66, and a control signal connector 67 also disposed in the cartridge body 66 as shown. The adaptor cartridge 42 is specifically configured for a TWECO® brand welding gun, whereas other interchangeable adaptor cartridges, as described in greater detail below, are specifically configured for other brands of welding guns. The adaptor fitting 68 provides both a mechanical connection to the welding apparatus (not shown), in addition to an electrical connection for welding current. The control signal connector 67 provides control signal connections for the welding apparatus. Accordingly, the cartridge body 66 is advantageously adapted for mechanical, welding current, and control signal connections, wherein each of these connections are made through a single component, i.e., the cartridge body 66 of the adaptor fitting 68, thereby providing an integrated adaptor cartridge 42 that is relatively simple and interchangeable, the interchangeability aspect of which described in greater detail below.

The cartridge body 66 is illustrated in one form as a rectangular block adapted to be interchangeably mounted to the wire feeder 10, and more specifically, the front portion 24 of the housing 12 by mechanical screws 69 in one form of the present disclosure. It should be understood that more or fewer screws 69 or mechanical fasteners may be employed while remaining within the scope of the present disclosure. Additionally, other types of mechanical connections such as quick release latches, threads, and quick disconnects, among others, may also be employed while remaining within the scope of the present disclosure.

Referring also to FIG. 4, the adaptor fitting 68 extends rearwardly from the cartridge body 66 toward the wire drive assembly 14 for engaging the feedplate 56. The adaptor fitting 68 includes a rearward extension 70 for engaging the feedplate 56 and a main body portion 72 secured to the cartridge body 66. The main body portion 72 is relatively larger than the rearward extension 70 so as to define a shoulder 74 therebetween. When the adaptor cartridge 42 is inserted into the front portion 24 of the wire feeder 10, the shoulder 74 of the adaptor fitting 68 contacts the end face 64 of the feedplate 56 to stop further advancement of the adaptor cartridge 42 toward the feedplate 56, thus properly positioning the adaptor cartridge 42 along the longitudinal direction of the wire feeder 10 as shown.

The rearward extension 70 preferably defines a substantially cylindrical shape to be inserted into a receptacle 75 of the feedplate 56, wherein the rearward extension 70 further includes a recessed surface 78. When the rearward extension 70 is inserted into the receptacle 75 and is properly positioned, the recessed surface 78 is aligned with a retaining screw 76, which engages the recessed surface 78 to secure the rearward extension 70 of the adaptor cartridge 42 in place.

Returning now to FIGS. 6 through 12, the main body portion 72 of the adaptor fitting 68 includes a front end 84 and a rear end 86. The front end 84 is fitted into an aperture 88 of the cartridge body 66. The aperture 88 in one form is preferably in the shape of a hexagon as shown, which inhibits rotational movement of the adaptor fitting 68 within the cartridge body 66. It should be understood that other shapes and sizes of apertures other than the exemplary hexagonal shape as illustrated herein shall be construed as being within the scope of the present disclosure. The front end 84 of the main body portion 72 and the aperture 88 of the cartridge body 66 are so configured that the interface between the front end 84 and the cartridge body 66 preferably defines an interference fit.

Figure 7:
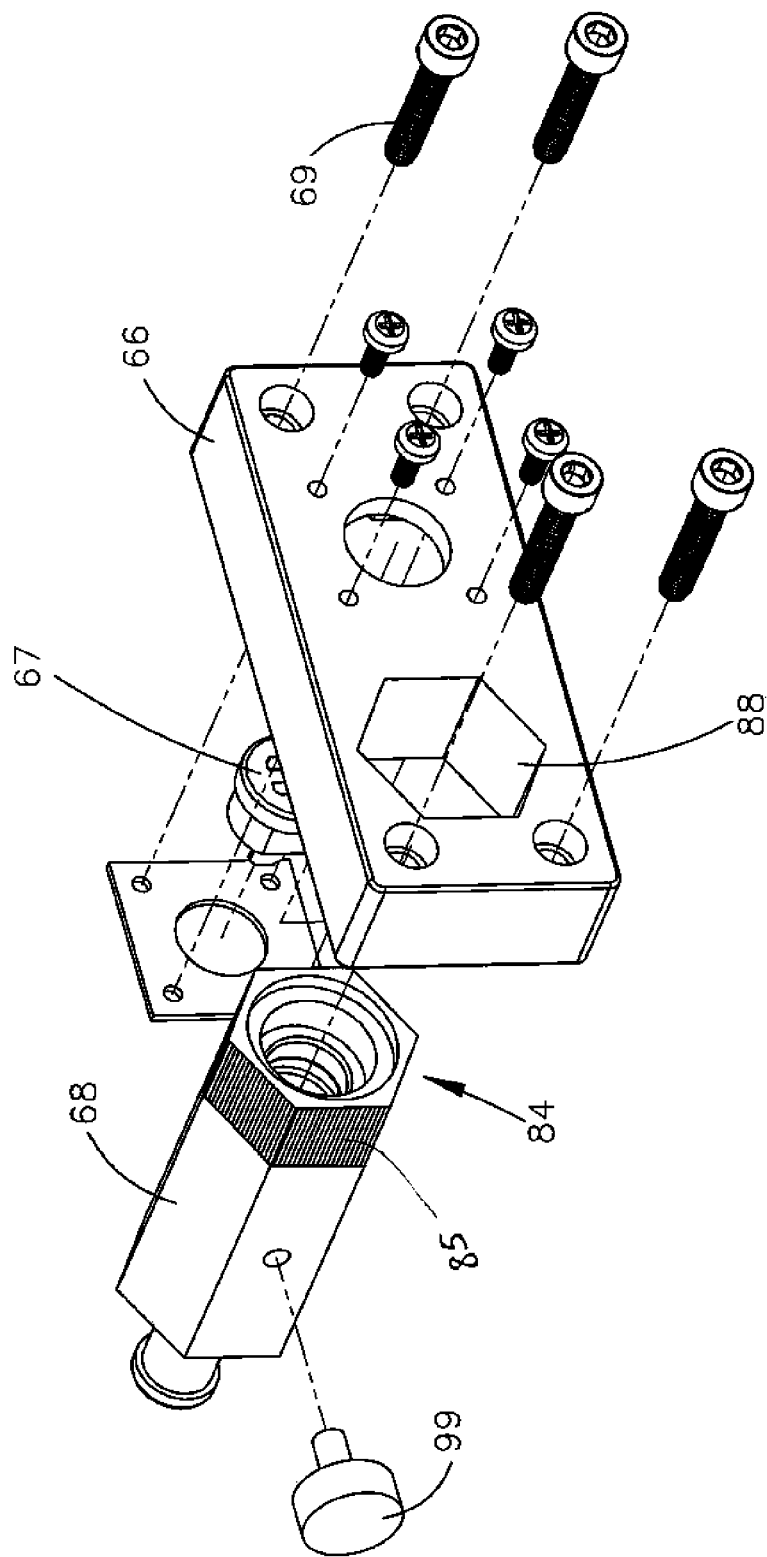
FIG. 7 is a an exploded perspective view of the adaptor cartridge in accordance with the teachings of the present disclosure.

In one form, the front end 84 of the adaptor fitting 68 comprises grooves 85, as shown in FIG. 7, which are machined or formed into the adaptor fitting 68. When the front end 84 of the adaptor fitting 68 and the cartridge body 66 engage, the material of the cartridge body 66 and the material of the adaptor fitting 68 adjacent the interface interlock to form a secure attachment therebetween. Accordingly, the cartridge body 66 is preferably made of plastic and the adaptor fitting 68 is preferably made of brass so that the grooves are able to deform the plastic cartridge body 66 for the secure attachment. Additionally, the brass adaptor fitting 68 is conductive and is thus capable of carrying the welding current. It should be understood, however, that other types of materials, along with other types of connection methods, may be employed while remaining within the scope of the present disclosure.

Figure 12:
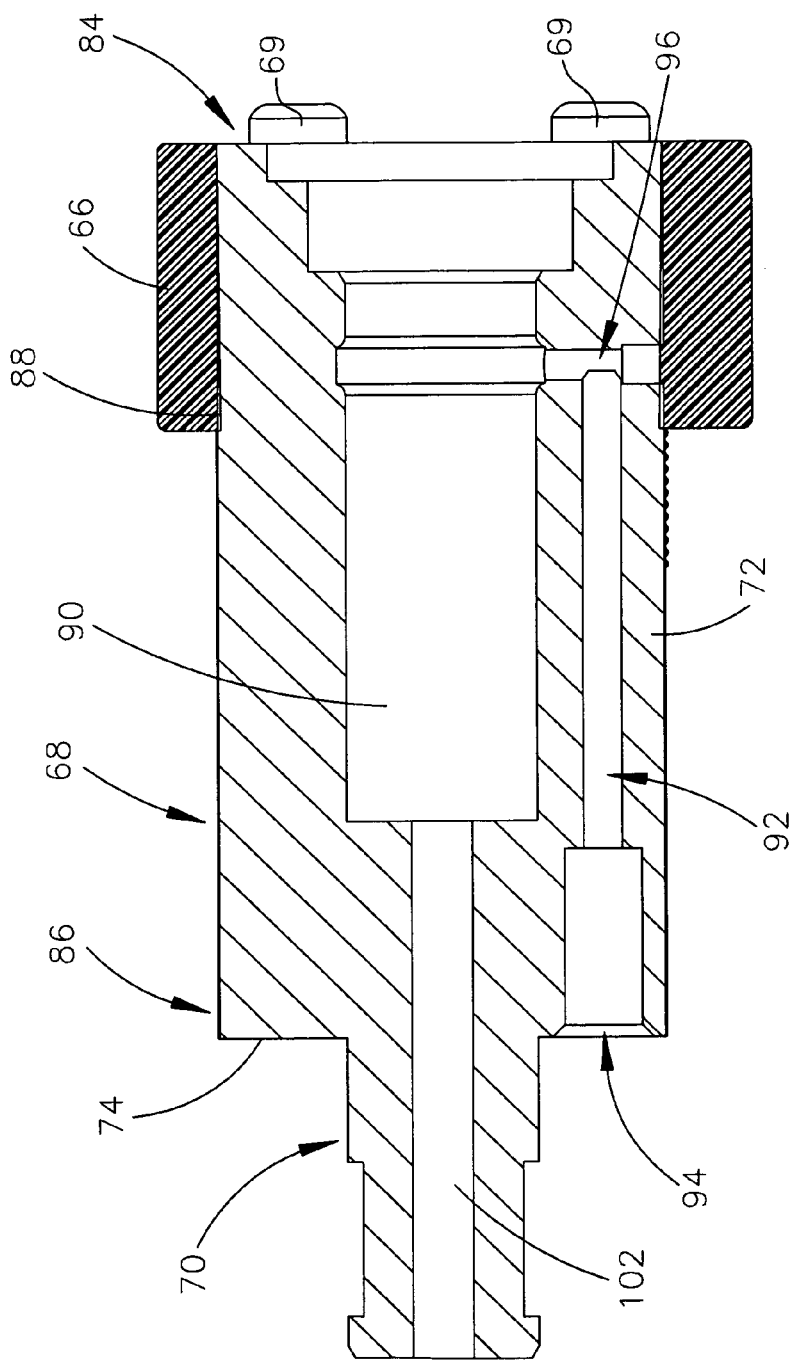
FIG. 12 is a side cross-sectional view, taken along line 12-12 of FIG. 10, of the adaptor cartridge in accordance with the teachings of the present disclosure.

As clearly shown in FIG. 12, the main body portion 72 has a receptacle 90 for receiving the welding apparatus, (not shown), and a gas passage 92. The gas passage 92 extends between an inlet 94 disposed at the shoulder 74 and an outlet 96 proximate the front end 84 of the main body portion 72. The outlet 96 is so positioned that when the welding apparatus that is compatible with the adaptor cartridge 42 is inserted, the outlet 96 is open to a gas inlet of the welding apparatus in order to deliver the shield gas from the shield gas source, through the gas valve 20 (FIG. 1), the gas hose, the adaptor cartridge 42 and then to the welding apparatus. A brass insert 93, as shown in FIG. 4, is adapted for an o-ring (not shown) to be disposed around, and may alternately be provided within the inlet 94 to prevent against leakage of the shield gas.

Generally, the receptacle 90 defines a geometry that complements the outer profile of the welding apparatus so that the welding apparatus properly fits into the receptacle 90. To secure the welding apparatus within the receptacle 90, a screw 99 is preferably provided that is threadably engaged within the main body portion 72 of the adaptor fitting 68. The screw 99 extends into the receptacle 90 and contacts an outer surface of the welding apparatus. As the screw 99 is tightened, the welding apparatus is engaged by the screw 99 and is thus secured thereto.

Referring again to FIG. 4, when the rearward extension 70 is engaged within the feedplate 56, the inlet 94 of the gas passage 92 is open to a gas passage 98 disposed in the feedplate 56. The gas passage 98 has one end open to the end face 64 and the other end preferably connected to a gas input fitting 100. The gas hose (not shown), which is connected to the gas valve 20 (FIG. 1), is connected to the gas input fitting 100 to deliver the shield gas to the gas passage 98 in the feedplate 56, the gas passage 92 in the adaptor cartridge 42, and then to a gas conduit (not shown) of the welding apparatus for the supply of shield gas.

Figure 11:
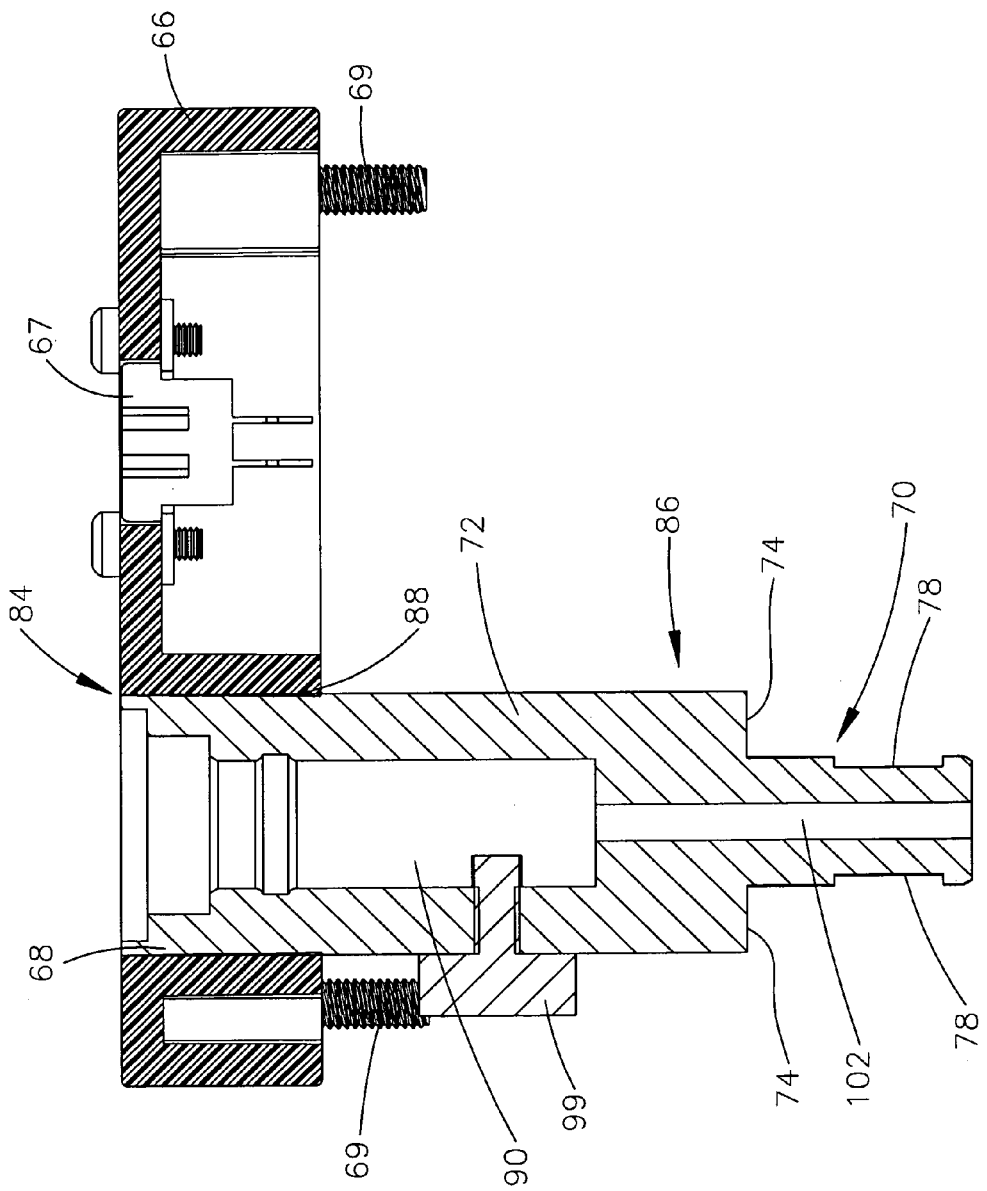
FIG. 11 is a top cross-sectional view, taken along line 11-11 of FIG. 8, of the adaptor cartridge in accordance with the teachings of the present disclosure.

Referring now to FIGS. 11 and 12 in conjunction with FIG. 4, the rearward extension 70 defines a conduit 102 extending along the length of the rearward extension 70 and to the receptacle 90 as shown. The conduit 102 is aligned with the channel 60 of the wire input guide 54 and the channel 62 of the feedplate 56. Accordingly, the welding wire (not shown) is delivered from the wire spool (also not shown), through the channel 60 of wire input guide 54, the channel 62 of the feedplate 56, the conduit 102 of the rearward extension 70, and to a corresponding conduit (not shown) of the welding apparatus received within the receptacle 90 for the supply of welding wire.

Generally, a welding apparatus includes a control switch or a trigger to allow an operator to turn on/off the welding apparatus or the shield gas supply at the work site when the wire feeder 10 is in an "on" position. When the trigger is operated, the welding wire, electric power, and the shield gas are delivered to the welding apparatus to cause an electric arc to initiate the arc welding process. Control wires extending from the control switch or the trigger of the welding apparatus must be connected to control circuits in the wire feeder 10 to enable the functioning of the control switch or trigger.

Figure 6:
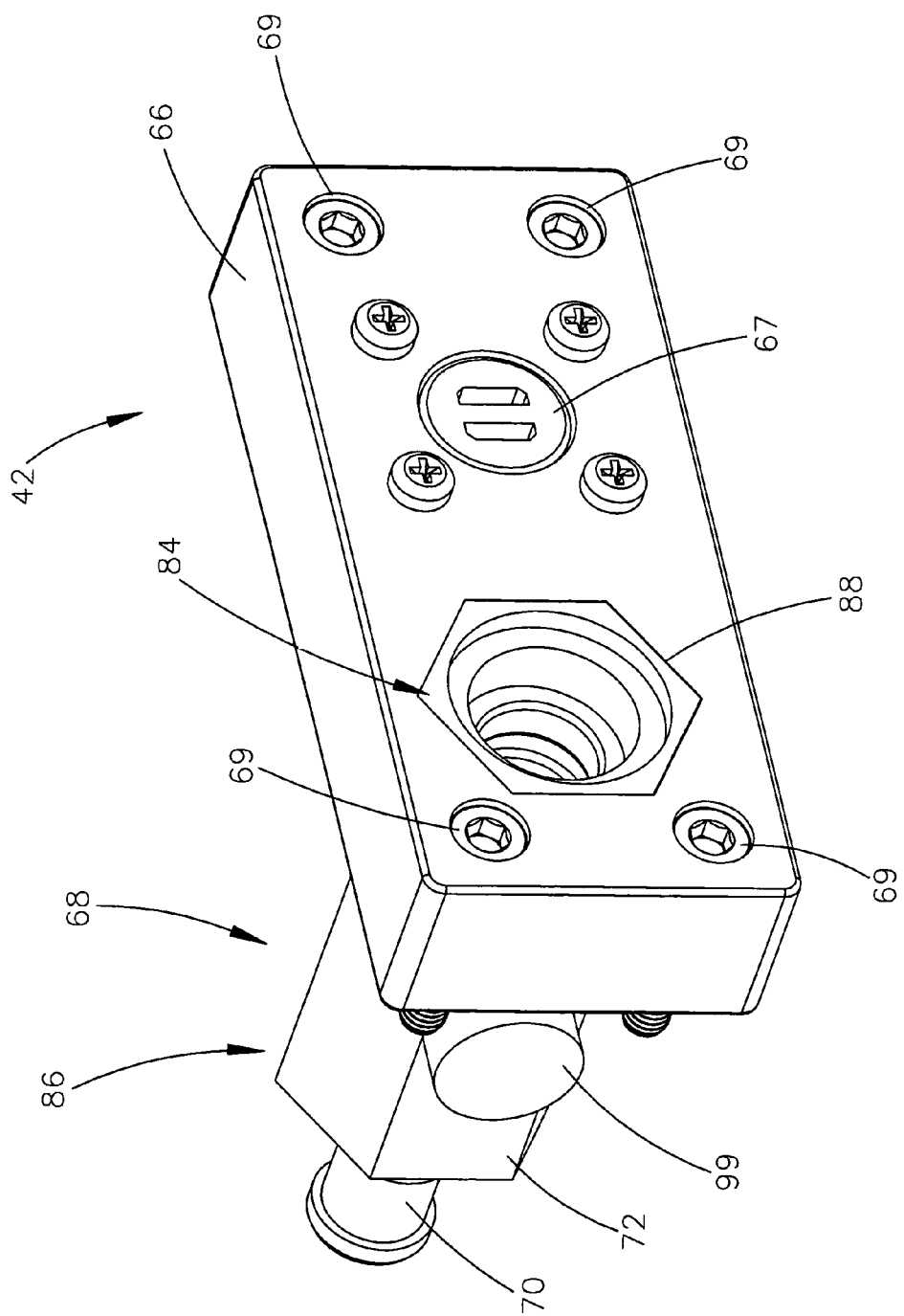
FIG. 6 is a perspective view of the adaptor cartridge in accordance with the teachings of the present disclosure.
Figure 8:
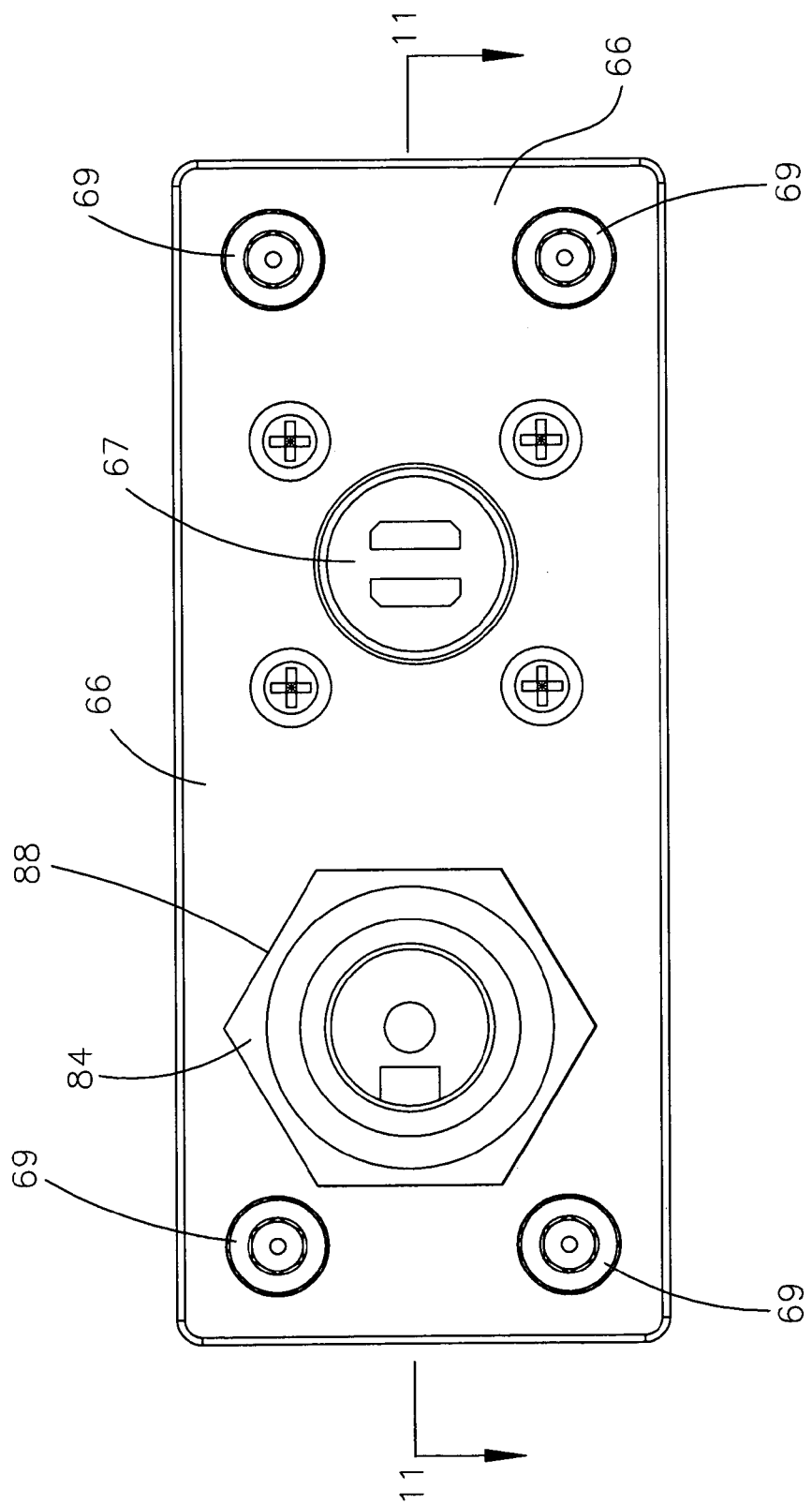
FIG. 8 is a front view of the adaptor cartridge in accordance with the teachings of the present disclosure.
Figure 9:
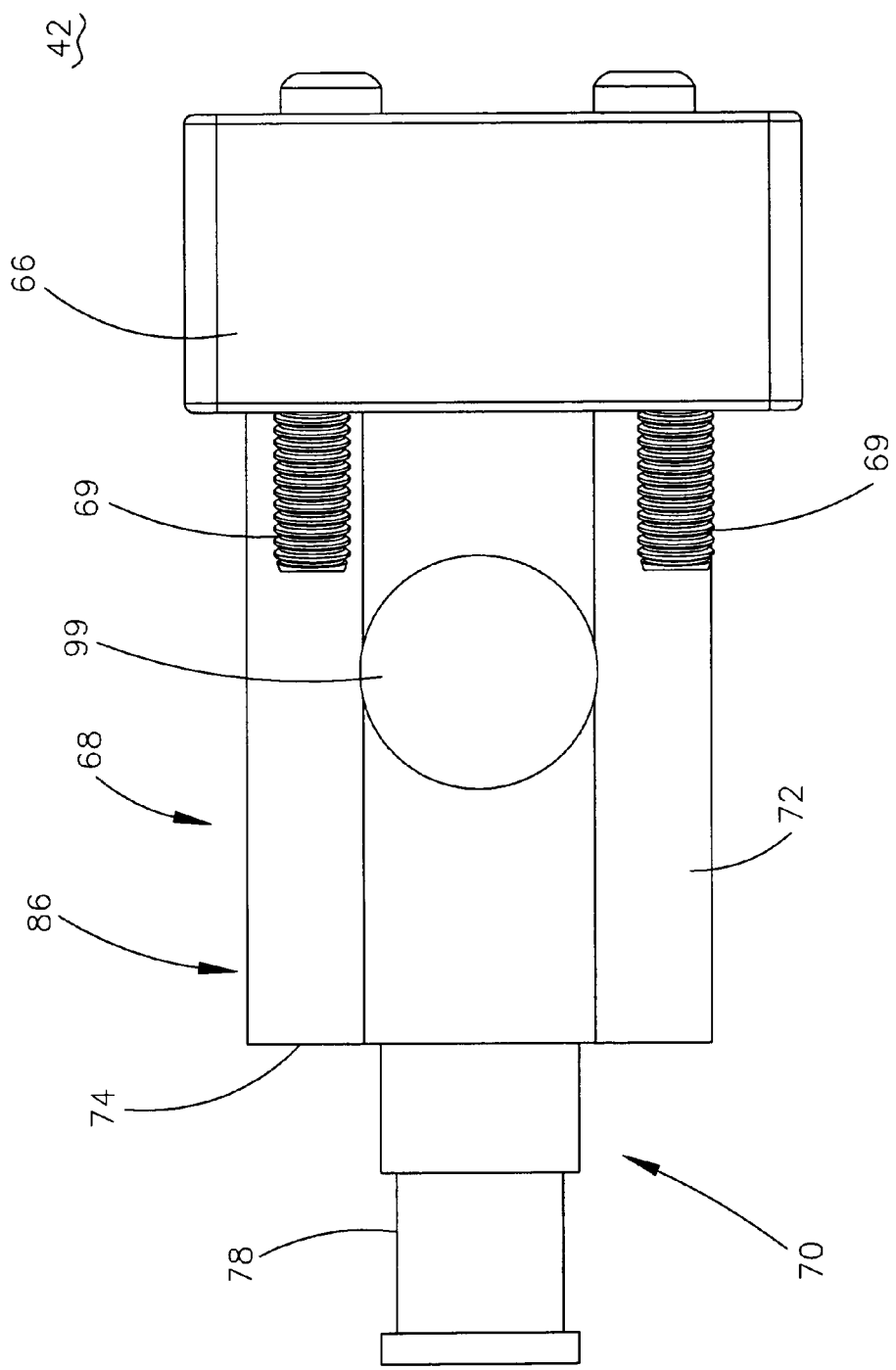
FIG. 9 is a side view of the adaptor cartridge in accordance with the teachings of the present disclosure.
Figure 10:
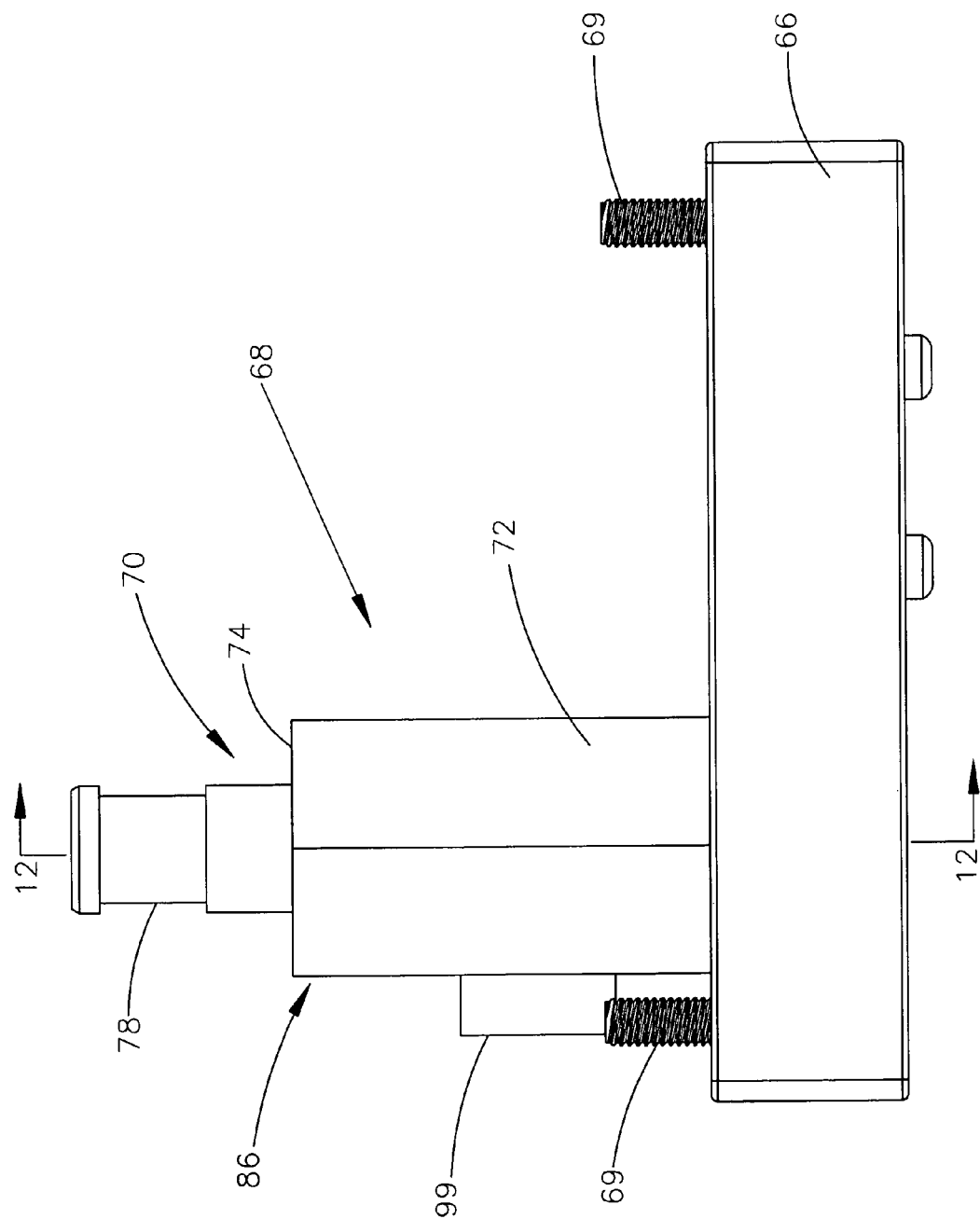
FIG. 10 is a top view of the adaptor cartridge in accordance with the teachings of the present disclosure.

Referring to FIGS. 6 through 8, the control signal connector 67 is, therefore, disposed in the cartridge body 66 for establishing control signal connections between the wire feeder 10 (the control circuits of the circuit board assembly 18, in particular) and the welding apparatus. The control signal connector 67 is configured to be mated with a terminal end of the control wires from the trigger and is specific to the particular welding apparatus, which is the TWECO® brand welding gun in this particular example. Accordingly, the control signal connector 67 is in the form of a receptacle to be mated with a terminal end of the TWECO® brand welding gun, which is in the form of a plug. Because the control signal connector 67 and the terminal end can be engaged and their electrical characteristics are compatible, the control signal connections can easily be established.

It should be noted that, while not shown in the figures, a conductive electrical path is also established through the adaptor fitting 68 to deliver welding current from the power source to the welding apparatus. The welding current connection is separate from the control signal connection established by the control signal connection 67 in the illustrated embodiment, and additional electrical connections within the housing 12 of the wire feeder 10 may also be required depending on the particular brand of welding apparatus being employed.

Variant I

Figure 13:
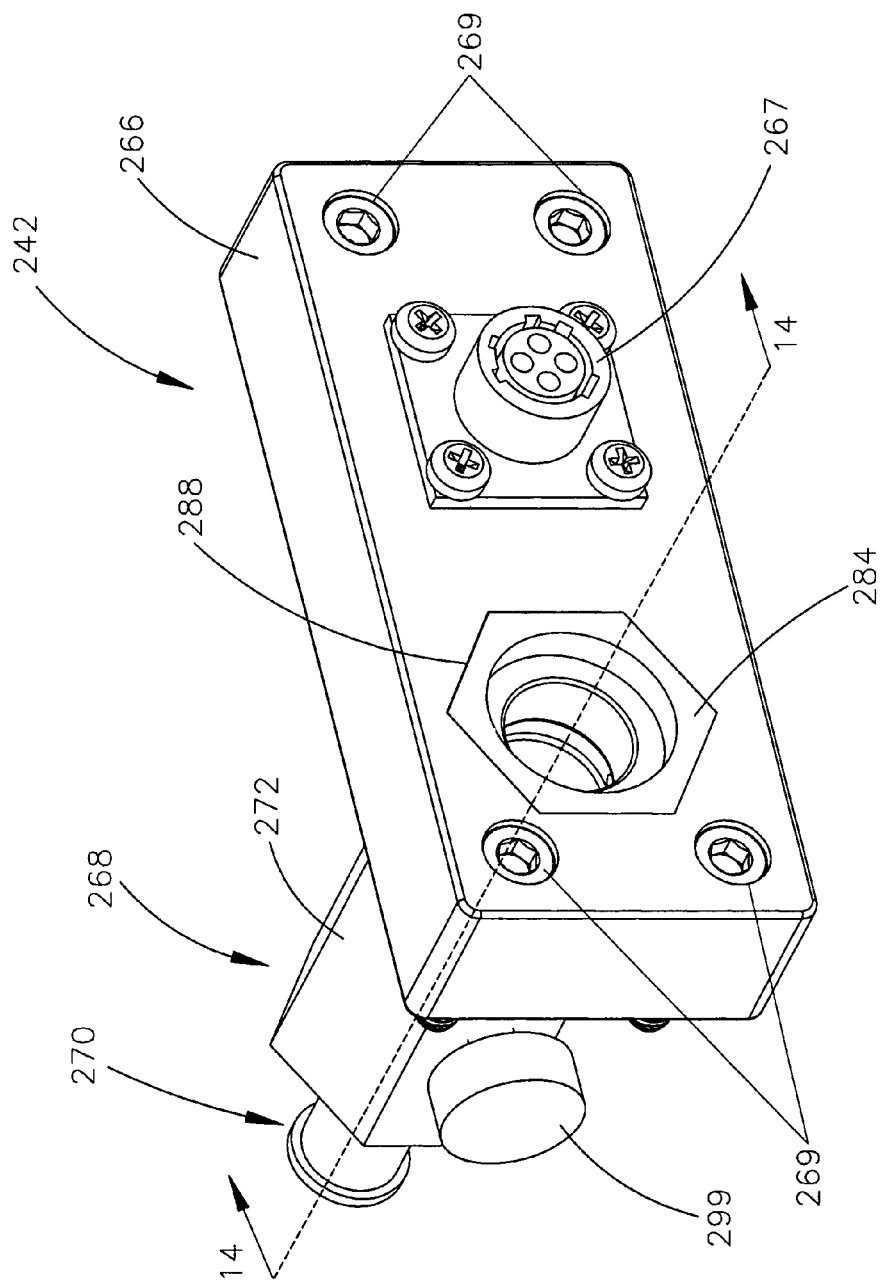
FIG. 13 is a perspective view of a first variant of an adaptor cartridge constructed in accordance with the teachings of the present disclosure.
Figure 14:
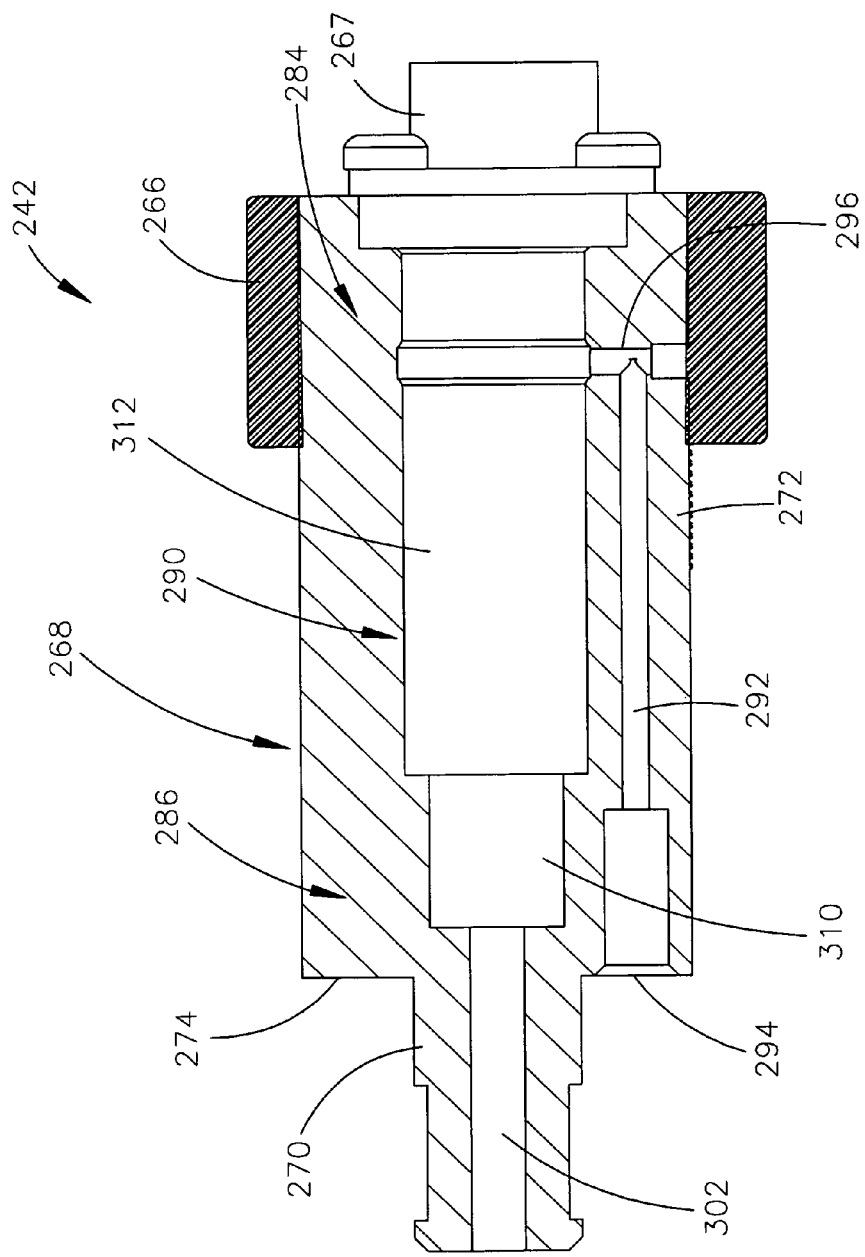
FIG. 14 is a side cross-sectional view, taken along line 14-14 of FIG. 13, of the first variant adaptor cartridge in accordance with the teachings of the present disclosure.

Referring now to FIGS. 13 and 14, a variant of an adaptor cartridge for connecting the wire feeder 10 to a different type of welding apparatus (not shown) is generally designated by reference numeral 242. The configuration of the adaptor cartridge 242 is specifically designed for a MILLER® brand welding gun, and the adaptor cartridge 242 is interchangeable with the other adaptor cartridges as illustrated herein such that the same wire feeder 10 can be used with a plurality of different welding apparatuses.

The adaptor cartridge 242 comprises a cartridge body 266, an adaptor fitting 268 disposed within the cartridge body 266, and a control signal connector 267 also disposed within the cartridge body 266. The cartridge body 266 is similarly mounted to the front portion 24 of the housing 12 by screws 269, which are so positioned that they can be threaded into the same tapped holes (not shown) within the housing 12 of the wire feeder 10 as in the case of the adaptor cartridge 42 in FIGS. 6 through 12 so as to interchangeably mount the adaptor cartridge 242 to the wire feeder 10. Accordingly, the cartridge body 266 of this variant defines substantially the same shape and substantially the same mounting configuration, i.e. four screws, as the cartridge body 66 as previously illustrated, such that the adapter cartridges are interchangeable with the same wire feeder 10. Therefore, as used herein, the term "interchangeable" shall be construed to mean that the adapter cartridges can be installed to and removed from the wire feeder 10 without the need for additional hardware or components to make the proper mechanical and electrical connections for the supply of welding current, welding wire, shield gas, and signal current to the welding apparatuses.

The adaptor fitting 268 comprises a main body portion 272 and a rearward extension 270 with a shoulder 274 defined therebetween. The rearward extension 270 of the adaptor fitting 268 defines substantially the same configuration as that of the rearward extension 70 of the adaptor fitting 68 in FIGS. 6 through 12. More specifically, the rearward extension 270 has substantially the same outer profile and length as those of the rearward extension 70 so that the rearward extension 270 of the adaptor cartridge 242 can be properly fitted into the receptacle 75 of the feedplate 56. More specifically, the end face 64 of the feedplate 56 contacts the shoulder 274 of the main body portion 272 to properly position the adaptor cartridge 242 along the longitudinal direction of the wire feeder 10.

In this variant, the main body portion 272 defines a front end 284 engaging the cartridge body 266 and a rear end 286 connected to the rearward extension 270. The main body portion 272 defines a receptacle 290 extending to the rear end 286. The receptacle 290 defines a first bore 310 connected to a conduit 302 within the rearward extension 270, and a second bore 312 extending from the first bore 310 to the front end 284. The first bore 310 has a diameter smaller than that of the second bore 312, wherein the first bore 310 and the second bore 312 complement the outer profile of the MILLER® brand welding apparatus.

The main body portion 272 defines a gas passage 292 extending between an inlet 294 and an outlet 296. Despite the different construction of the main body portion 70 and 272 and the different length of the gas passages 92 and 292 of the different adaptor cartridges 42 and 242, respectively, the inlets 94 and 294 are disposed at a common position relative to the respective one of the rearward extensions 70 and 270 in order to provide interchangeability. As the rearward extension 270 is inserted into the receptacle 75 of the feedplate 56 and is properly positioned, the inlet 294 is in communication with the gas passage 98 of the feedplate 56 to provide delivery of shield gas from the gas hose, through the adaptor cartridge 242, and then to the welding apparatus.

The position of the outlet 296, however, is different from that of the outlet 96 of the adaptor cartridge 42 because the position of the gas inlet of the MILLER® brand welding apparatus is different than the gas inlet of the TWECO® brand welding apparatus. Therefore, the position of the outlets 96, 296 varies among the adaptor cartridges 42 and 242, which also vary depending on the brand of welding apparatus employed.

As further shown, the control signal connector 267 is disposed within the cartridge body 266 for establishing control signal connections between the wire feeder 10 (the control circuits of the circuit board assembly 18, in particular) and the welding apparatus. The control signal connector 267 is configured to be mated with a terminal end of the control wires from the trigger and is specific to the particular welding apparatus, which is the MILLER® brand welding gun in this particular example. Accordingly, the control signal connector 267 is in the form of a receptacle to be mated with a terminal end of the MILLER® brand welding gun, which is in the form of a plug. Because the control signal connector 267 and the terminal end can be engaged and their electrical characteristics are compatible, the control signal connections can easily be established.

Variant II

Figure 15:
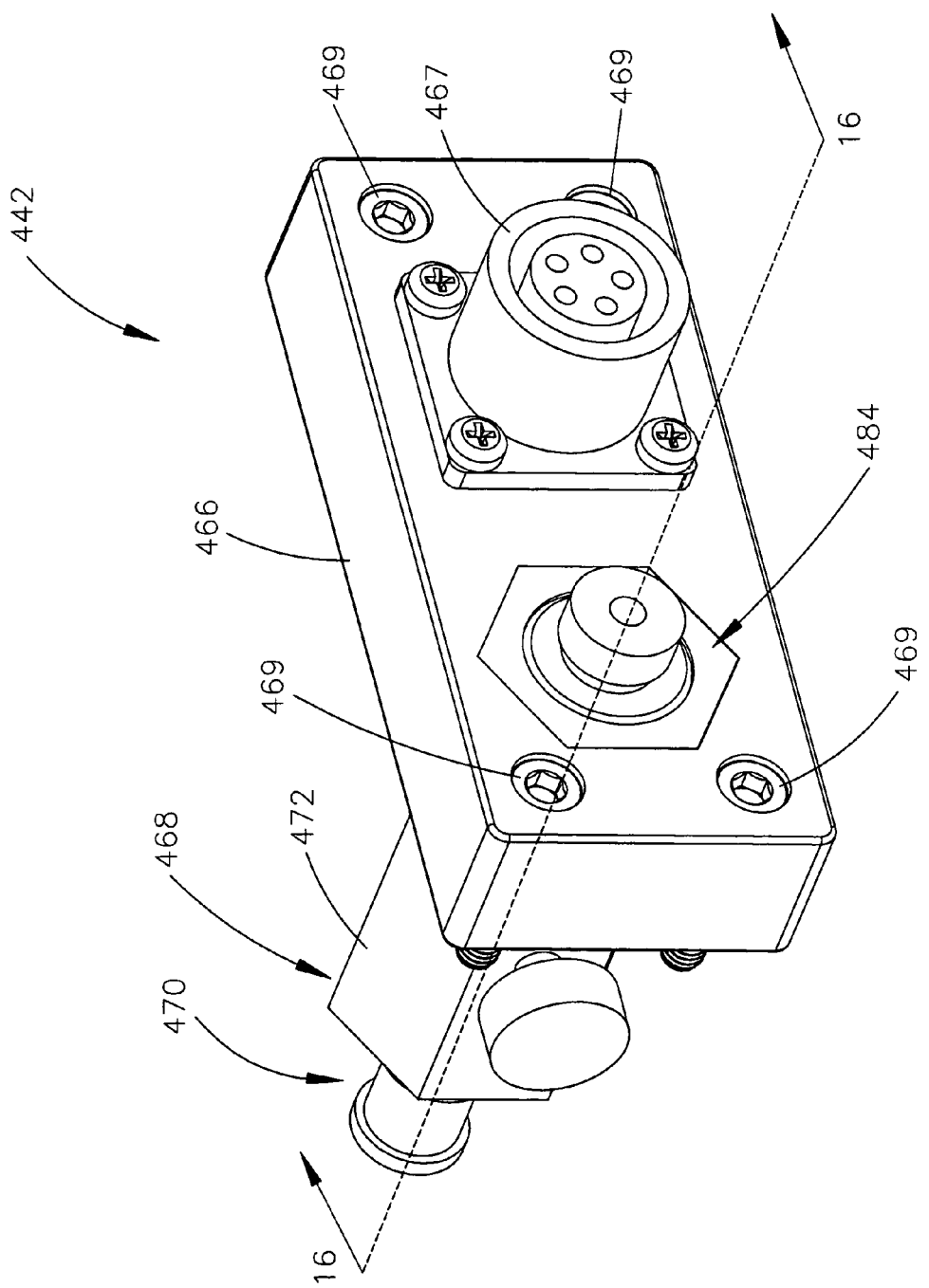
FIG. 15 is a perspective view of a second variant of an adaptor cartridge constructed in accordance with the teachings of the present disclosure.
Figure 16:
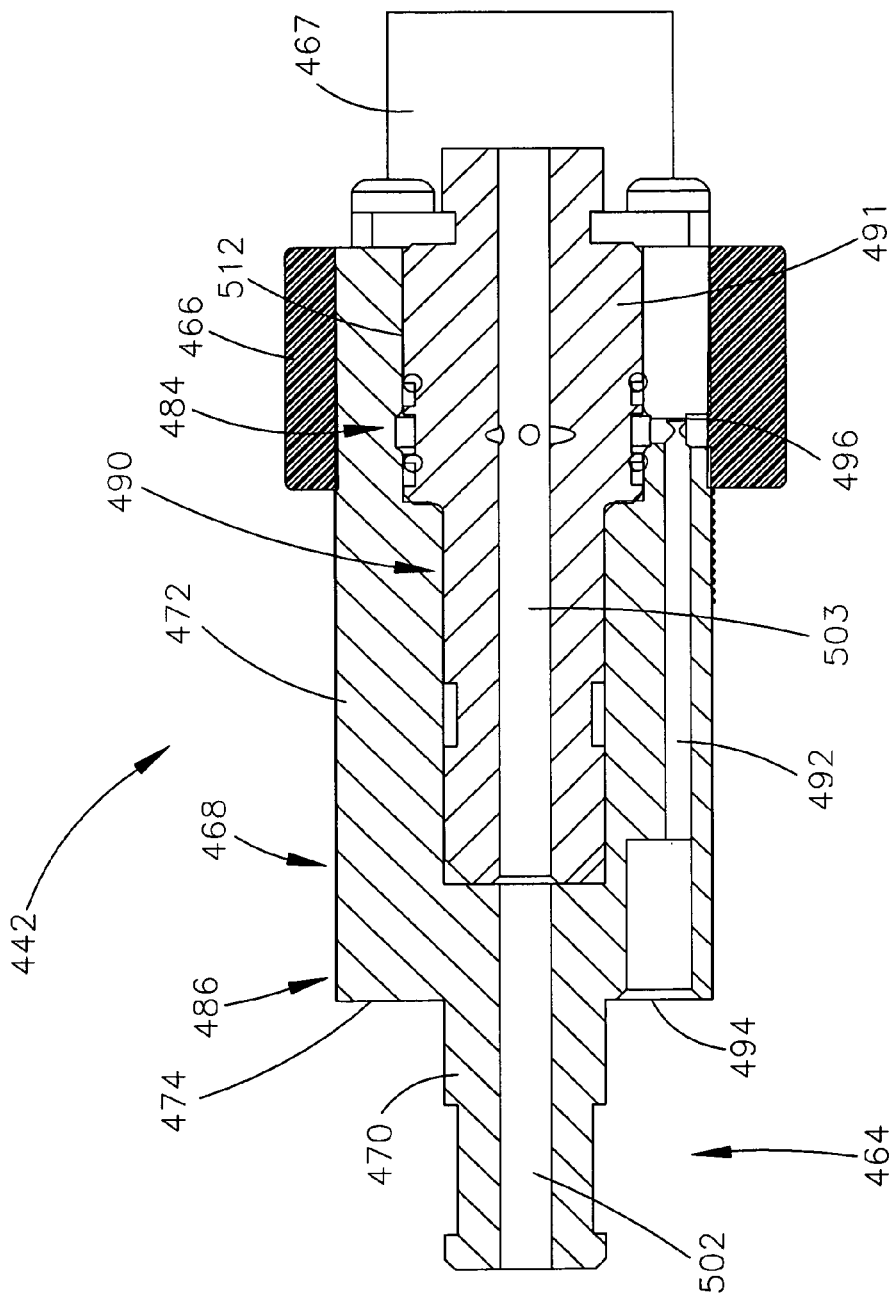
FIG. 16 is a side cross-sectional view, taken along line 16-16 of FIG. 15, of the second variant adaptor cartridge in accordance with the teachings of the present disclosure.

Referring now to FIGS. 15 and 16, another variant of an adaptor cartridge suitable for connecting the wire feeder 10 to another different type of welding apparatus (not shown) is generally designated by reference numeral 442. The configuration of the adaptor cartridge 442 is specifically designed for a LINCOLN® brand welding gun, and the adaptor cartridge 442 is interchangeable with the other adaptor cartridges as illustrated herein such that the same wire feeder 10 can be used with a plurality of different welding apparatuses.

The adaptor cartridge 442 comprises a cartridge body 466, an adaptor fitting 468 disposed within the cartridge body 466, and a control signal connector 467 also disposed within the cartridge body 466. The cartridge body 466 is similarly mounted to the front portion 24 of the housing 12 by screws 469, which are so positioned that they can be threaded into the same tapped holes (not shown) within the housing 12 of the wire feeder 10 as in the case of the adaptor cartridges 42 and 242 so as to interchangeably mount the adaptor cartridge 442 to the wire feeder 10. Accordingly, the cartridge body 466 of this variant defines substantially the same shape and substantially the same mounting configuration, i.e. four screws, as the cartridge bodies 66 and 266 as previously illustrated, such that the adapter cartridges are interchangeable with the same wire feeder 10.

The adaptor fitting 468 comprises a main body portion 472 and a rearward extension 470 with a shoulder 474 defined therebetween. The rearward extension 470 of the adaptor fitting 468 defines substantially the same configuration as the rearward extensions 70 and 270 of the adaptor cartridges 42 and 242, respectively, as previously illustrated. More specifically, the rearward extension 470 has substantially the same outer profile and length so that the rearward extension 470 can be properly fitted and secured into the receptacle 75 of the feedplate 56 as previously described.

The main body portion 472 includes a front end 484 proximate the cartridge body 466 and a rear end 486 proximate the rearward extension 470. The main body portion 472 defines a receptacle 490 having an enlarged portion 512 proximate the front end 484 configured to receive a secondary fitting 491. The secondary fitting 491 is specific to the LincolnLIN-COLN® brand welding gun and is provided such that the entire adaptor cartridge 442 can be interchangeable with the wire feeder 10. As further shown, a conduit 502 extends along the length of the rearward extension 470 and further to the rear end 486 of the main body portion 472. The conduit 502 is in communication with a conduit 503 of the secondary fitting 491 to provide a path for delivery of the welding wire.

The main body portion 472 also defines a gas passage 492 extending between an inlet 494 and an outlet 496. Despite the different construction of the main body portions 70, 272, and 472, and the different lengths of the gas passages, the inlets 94, 294, and 494 are disposed at a common position relative to the respective one of the rearward extensions 70, 270, and 470 in order to provide interchangeability. Accordingly, the inlet 494 is formed on the shoulder 474 and is disposed in the same position relative to the rearward extension 470.

The position of the outlet 496, however, is different from that of the outlets 96 and 296 because the position of the gas inlet of the LINCOLN® brand welding gun is different than the gas inlets of the other brand welding guns. Therefore, the position of the outlets 96, 296, and 496 varies among the adaptor cartridges 42, 242, and 442, which also vary depending on the brand of welding apparatus employed.

The control signal connector 467 is disposed within the cartridge body 466 for establishing control signal connections between the wire feeder 10 (the control circuits of the circuit board assembly 18, in particular) and the welding apparatus. The control signal connector 467 is configured to be mated with a terminal end of the control wires from the trigger and is specific to the particular welding apparatus, which is the LINCOLN® brand welding gun in this particular example. Accordingly, the control signal connector 467 is in the form of a receptacle to be mated with a terminal end of the LINCOLN® brand welding gun, which is in the form of a plug. Because the control signal connector 467 and the terminal end can be engaged and their electrical characteristics are compatible, the control signal connections can easily be established.

Variant III

Figure 17:
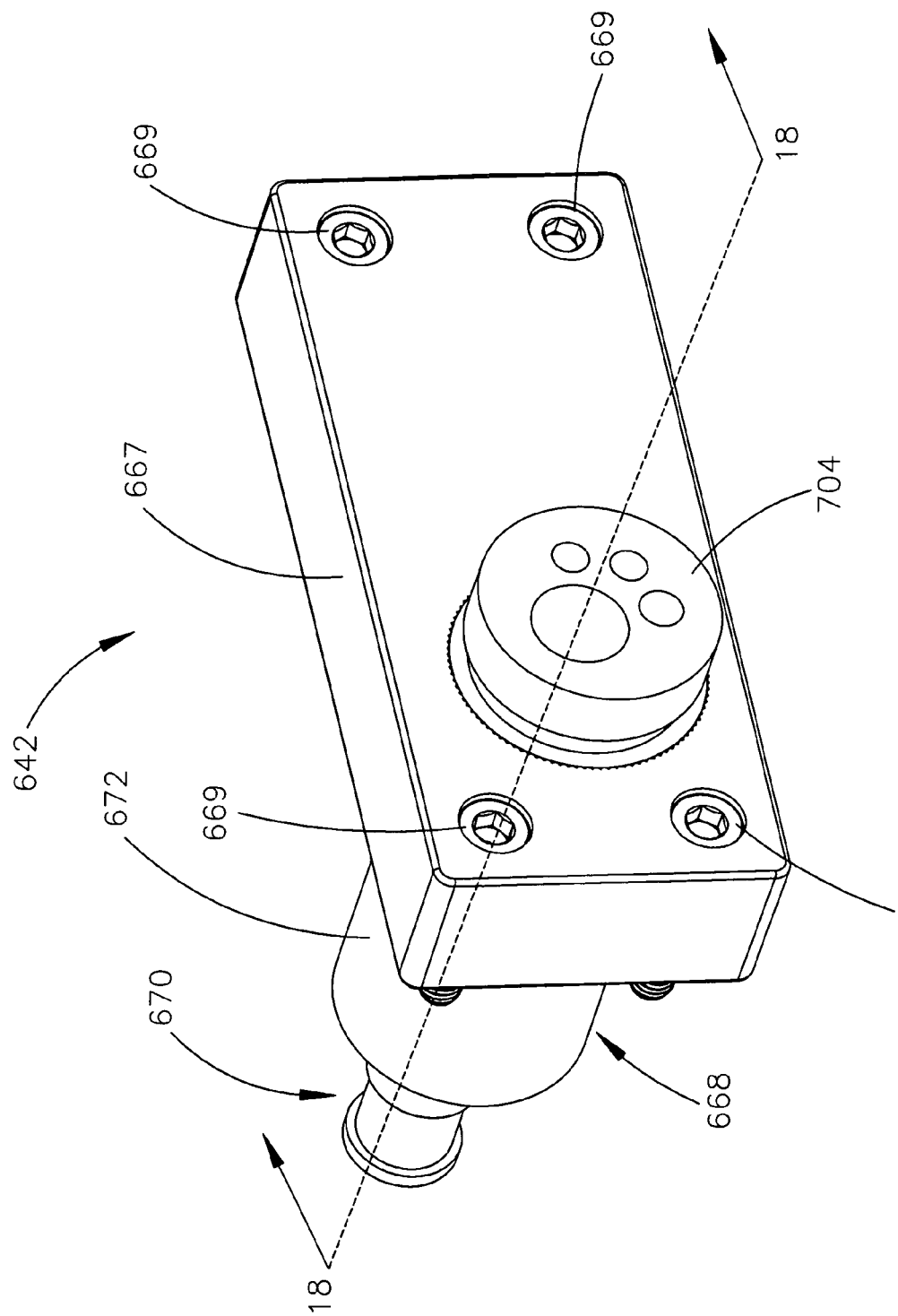
FIG. 17 is a perspective view of a third variant of an adaptor cartridge constructed in accordance with the teachings of the present disclosure.
Figure 18:
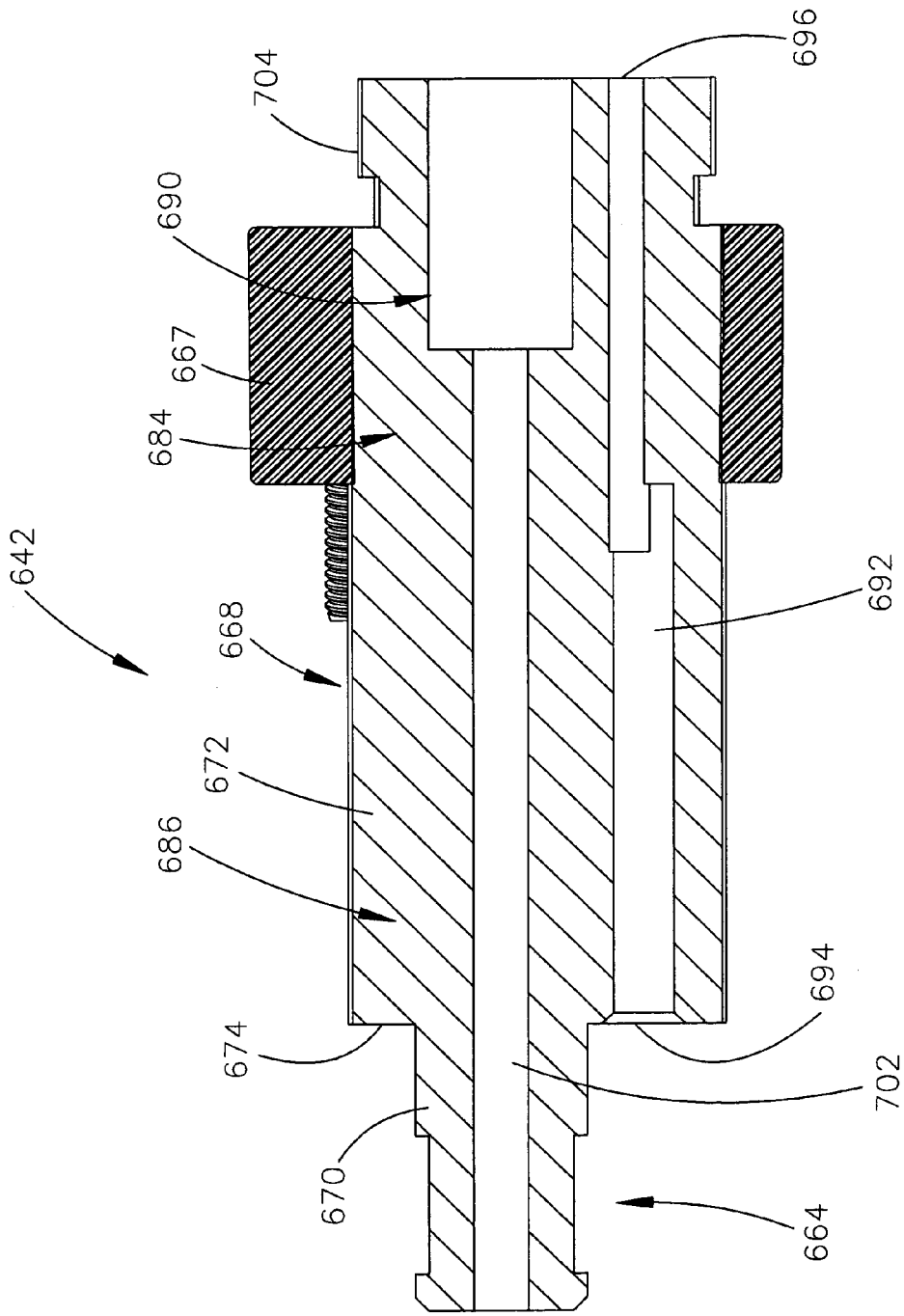
FIG. 18 is a side cross-sectional view, taken along line 18-18 of FIG. 17, of the third variant adaptor cartridge in accordance with the teachings of the present disclosure.

Referring to FIGS. 17 and 18, still another variant of an adaptor cartridge for connecting the wire feeder 10 to still another different type of welding apparatus (not shown) is generally designated by reference numeral 642. The configuration of the adaptor cartridge 642 is specifically designed for a European style welding gun, and the adaptor cartridge 642 is interchangeable with the other adaptor cartridges as illustrated herein such that the same wire feeder 10 can be used with a plurality of different welding apparatuses.

The adaptor cartridge 642 comprises a cartridge body 667 and an adaptor fitting 668. In this particular variant, the control signal connections are integral with the adaptor fitting 668 rather than being a separate connector as previously illustrated. In this embodiment, the smaller openings are signal connections and shield gas, and the larger opening is for welding current.

The cartridge body 667 is similarly mounted to the front portion 24 of the housing 12 by screws 669, which are so positioned that they can be threaded into the same tapped holes (not shown) within the housing 12 of the wire feeder 10 as in the case of the adaptor cartridges 42, 242, and 442 so as to interchangeably mount the adaptor cartridge 642 to the wire feeder 10. Accordingly, the cartridge body 667 of this variant defines substantially the same shape and substantially the same mounting configuration, i.e. four screws, as the cartridge bodies 66, 266, and 466 as previously illustrated, such that the adapter cartridges are interchangeable with the same wire feeder 10.

The adaptor fitting 668 comprises a main body portion 672 and a rearward extension 670 with a shoulder 674 defined therebetween. The rearward extension 670 similarly defines substantially the same configuration as the rearward extensions 70, 270 and 470 to provide interchangeability. Accordingly, the rearward extension 670 and can be properly fitted and secured into the receptacle 75 of the feedplate 56 as previously described.

The main body portion 672 has a front end 684 engaging the cartridge body 667 and a rear end 686 connected to the rearward extension 670. A conduit 702 extends along the length of the rearward extension 670 and further to the front end 684 of the main body portion 672. The main body portion 672 defines a receptacle 690, which is in communication with the conduit 702 as shown, thereby providing a path for delivery of the welding wire.

The main body portion 672 also defines a gas passage 692 extending between an inlet 694 and an outlet 696. The inlet 694 is disposed at the shoulder 674 and in the same position relative to the rearward extension 670 as the inlets 94, 294, 494 relative to the rearward extensions 70, 270 and 470, respectively, in order to again provide interchangeability.

With the set of interchangeable adaptor cartridges 42, 242, 442, and 642, as illustrated and described herein, the same wire feeder 10 can be used with a plurality of different welding apparatuses from different manufacturers. As a result, the adaptor cartridges according to the teachings of the present disclosure contribute significantly to reduced operating and inventory costs for the end user.

The description herein is merely exemplary in nature and, thus, variations that do not depart from the gist of the disclosure are intended to be within the scope of the disclosure. For example, although the teachings of the present disclosure primarily encompass welding with shield gas, other types of welding such as welding with a flux cored wire without shield gas, among other types of processes including, but not limited to, welding, cutting, or spraying, are certainly to be regarded as within the scope of the disclosure.

What is claimed is:

1. An adaptor cartridge for connecting a welding apparatus to a wire feeder comprising:
   a cartridge body having a front side and a rear side, the cartridge body defining an aperture having an inner profile wherein the cartridge body is interchangeably mounted to a housing of the wire feeder;
   mechanical, welding current, and control signal connections disposed within the adaptor cartridge; and
   an adaptor fitting defining an outer profile, the outer profile configured to mate with the inner profile of the aperture through the cartridge body, the adapter fitting further defining a conduit therein, the conduit of the adaptor fitting being configured to receive a welding wire therethrough, the adaptor fitting disposed in the cartridge body, extending through the aperture at least from the front side to the rear side of the cartridge body, and disposed inside the housing of the wire feeder when the cartridge body is mounted to the housing of the wire feeder.

2. The adaptor cartridge according to claim 1, wherein the mechanical and the welding current connections are separate from the control signal connection.

3. The adaptor cartridge according to claim 1, wherein the mechanical connection includes a gas connection.

4. The adaptor cartridge according to claim 1, the adaptor fitting being configured to establish the mechanical and the welding current connections from the welding apparatus to the wire feeder.

5. The adaptor cartridge according to claim 4, wherein the adaptor fitting includes at least one gas passageway for establishing gas communication between the wire feeder and the welding apparatus.

6. The adaptor cartridge according to claim 4, wherein the adaptor fitting further comprises a receptacle adapted for receiving the welding apparatus.

7. The adaptor cartridge according to claim 6, further comprising a device for securing the welding apparatus within the receptacle.

8. The adaptor cartridge according to claim 7, wherein the device defines a screw threadably engaged within the adaptor fitting and traversing the receptacle for contact with the welding apparatus.

9. The adaptor cartridge according to claim 4, wherein the conduit is aligned with a channel of the wire feeder to guide the welding wire from the wire feeder to the welding apparatus.

10. The adaptor cartridge according to claim 4, wherein the adaptor fitting and the cartridge body comprise an interface, the interface defining an interference-fit.

11. The adaptor cartridge according to claim 4, wherein the adaptor fitting is made of brass.

12. The adaptor cartridge according to claim 1, wherein the cartridge body is made of plastic.

13. The adaptor cartridge according to claim 1, further comprising a control signal connector disposed in the cartridge body.

14. The adaptor cartridge according to claim 1, wherein the welding apparatus comprises a MIG welding gun.

15. An adaptor cartridge for use in connecting a welding apparatus to a wire feeder comprising:
   a cartridge body having a front side and a rear side, the cartridge body defining an aperture having an inner profile and configured to be interchangeably and removably mounted to a housing of the wire feeder;
   an adaptor fitting defining an outer profile, the outer profile configured to mate with the inner profile of the aperture through the cartridge body, and the adapter fitting defining a conduit, the adaptor fitting extending through the aperture at least from the front side to the rear side of the cartridge body, the conduit of the adaptor fitting being configured to receive a welding wire therethrough; and
   a control signal connector disposed in the cartridge body, wherein the adaptor cartridge has mechanical, welding current, and control signal connections within the adaptor cartridge, the adaptor fitting providing the mechanical and welding current connections, and the control signal connector providing the control signal connections, the adaptor fitting disposed inside the housing of the wire feeder when the adaptor cartridge is mounted to the housing of the wire feeder.

16. A set of interchangeable adaptor cartridges for connecting a set of welding apparatuses to a housing of a wire feeder, the set of interchangeable adaptor cartridges comprising at least a first adaptor cartridge and a second adaptor cartridge, wherein the first adaptor cartridge has a first cartridge body having first mechanical, welding current, and control signal connections for a respective one of the welding apparatuses to the wire feeder, and the second adaptor cartridge has a second cartridge body having second mechanical, welding current, and control signal connections for another respective one of the welding apparatuses to the wire feeder, the first and second mechanical connections being different from each other, the first and second cartridge bodies have a front side and a rear side, each cartridge body defining an aperture having an inner profile and configured to be interchangeably and removably mounted to the housing of the wire feeder;
   a first adapter fitting defining an outer profile, the outer profile configured to mate with the inner profile of the aperture through the first cartridge body, and the first adapter fitting defining a conduit, the first adaptor fitting extending through the aperture at least from the front side to the rear side of the cartridge body, the conduit of the first adaptor fitting being configured to receive a welding wire therethrough;
   a second adapter fitting defining an outer profile, the outer profile configured to mate with the inner profile of the aperture through the second cartridge body, and the second adapter fitting defining a conduit, the second adaptor fitting extending through the aperture at least from the front side to the rear side of the cartridge body, the conduit of the second adaptor fitting being configured to receive a welding wire therethrough;

wherein the first adapter cartridge and the second adaptor cartridge have the same outer profiles and mounting constructions to be mounted to the housing of the wire feeder.

17. The set of adaptor cartridges according to claim 16, the first adapter cartridge further comprising a first adaptor fitting disposed in the first cartridge body, the first adaptor fitting including a first rearward extension for connection to a feedplate of the wire feeder, the second adapter cartridge further comprising a second adaptor fitting disposed in the second cartridge body, the second adaptor fitting including a second rearward extension for connection to the feedplate of the wire feeder.

18. The set of adaptor cartridges according to claim 17, wherein the first and second rearward extensions of the set of adaptor cartridges define a common outer profile.

19. The set of adaptor cartridges according to claim 17, wherein the adaptor fittings each include an inlet, an outlet, and at least one gas passage between the inlet and the outlet for establishing gas communication between the respective one of the welding apparatuses and the wire feeder.

20. The set of adaptor cartridges according to claim 19, wherein the inlets are disposed at a common position relative to the respective one of the rearward extensions.

21. A set of interchangeable adaptor cartridges for connecting a set of welding apparatuses to a housing of a wire feeder, the set of adaptor cartridges each having a cartridge body and an adaptor fitting, each cartridge body having mechanical, welding current, and control signal connections for a respective one of the welding apparatuses to the wire feeder, the cartridge body having a front side and a rear side, each cartridge body defining an aperture having an inner profile and configured to be interchangeably and removably mounted to the housing of the wire feeder;

the adapter fitting defining an outer profile, the outer profile configured to mate with the inner profile of the aperture through the cartridge body, and the adapter fitting defining a conduit, the adaptor fitting extending through the aperture at least from the front side to the rear side of the cartridge body, the conduit of the first adaptor fitting being configured to receive a welding wire therethrough;

wherein the adaptor fittings each include an inlet, an outlet, and at least one gas passage between the inlet and the outlet for establishing gas communication between the respective one of the welding apparatuses and the wire feeder, wherein the adaptor fittings are disposed inside the housing of the wire feeder when the adaptor cartridges are mounted to the housing of the wire feeder, and wherein a position of the outlets varies among the set of adaptor cartridges.

22. The set of adaptors according to claim 17, wherein each of the adaptor fittings includes a receptacle for receiving the welding apparatuses.

23. A set of interchangeable adaptor cartridges for connecting a set of welding apparatuses to a housing of a wire feeder, the set of adaptor cartridges each having a cartridge body, each cartridge body having mechanical, welding current, and control signal connections for a respective one of the welding apparatuses to the wire feeder, each adaptor cartridge further comprising an adaptor fitting disposed in the cartridge body, the cartridge body having a front side and a rear side, each cartridge body defining an aperture having an inner profile;

the adapter fitting defining an outer profile, the outer profile configured to mate with the inner profile of the aperture through the cartridge body, and the adapter fitting defining a conduit, the adaptor fitting extending through the aperture at least from the front side to the rear side of the cartridge body, the conduit of the first adaptor fitting being configured to receive a welding wire therethrough, the adaptor fitting including a rearward extension for connection to a feedplate of the wire feeder, the adaptor fitting including a receptacle for receiving one of the welding apparatuses, and wherein the receptacle defines a configuration that varies among the set of adaptor cartridges, and wherein the adaptor fitting is disposed inside the housing of the wire feeder when the adaptor cartridges are mounted to the housing of the wire feeder.

24. A set of interchangeable adaptor cartridges for connecting a set of welding apparatuses to a housing of a wire feeder, the set of adaptor cartridges each having a cartridge body, each cartridge body having mechanical, welding current, and control signal connections for a respective one of the welding apparatuses to the wire feeder, the cartridge body having a front side and a rear side, each cartridge body defining an aperture having an inner profile, each adaptor cartridge further comprising an adaptor fitting disposed in the cartridge body, the adapter fitting defining an outer profile, the outer profile configured to mate with the inner profile of the aperture through the cartridge body, the adaptor fitting extending through the aperture at least from the front side to the rear side of the cartridge body, the adaptor fitting including a rearward extension for connection to a feedplate of the wire feeder, the adaptor fitting including a receptacle for receiving one of the welding apparatuses, and wherein the adaptor fitting further comprises a conduit for receiving welding wire, a length of the conduit varying among the set of adaptor cartridges, and wherein the adaptor fitting is disposed inside the housing of the wire feeder when the adaptor cartridge is mounted to the housing of the wire feeder.

25. The set of adaptor cartridges according to claim 16, wherein each cartridge body further comprises a control signal connector disposed therein.

26. A set of interchangeable adaptor cartridges for connecting a set of welding apparatuses to a wire feeder, the set of adaptor cartridges each having a cartridge body, the cartridge body having a front side and a rear side, each cartridge body defining an aperture having an inner profile, each cartridge body having mechanical, welding current, and control signal connections for a respective one of the welding apparatuses to the wire feeder, the cartridge body further comprising a control signal connector disposed therein, the set of adapter cartridges each having an adapter fitting defining an outer profile, the outer profile configured to mate with the inner profile of the aperture through the cartridge body, and the adapter fitting defining a conduit, the adaptor fitting extending through the aperture at least from the front side to the rear side of the cartridge body, the conduit of the first adaptor fitting being configured to receive a welding wire therethrough;

wherein the control signal connector defines a configuration that varies among the set of adaptor cartridges, and wherein the cartridge bodies of the set of interchangeable adaptor cartridges have the same outer profiles and mounting configurations.

27. A wire feeder comprising:
a housing;
a wire feeder plate disposed within the housing; and an adaptor cartridge interchangeably mounted to the housing and having mechanical, welding current, and control signal connections within the adaptor cartridge for operatively connecting a welding apparatus to the housing, the adaptor cartridge including a cartridge body having a front side and a rear side, the cartridge body defining an aperture having an inner profile, an adaptor fitting defining an outer profile, the outer profile configured to mate with the inner profile of the aperture of the cartridge body, the adapter fitting extending through the aperture at least from the front side to the rear side of the adaptor body, the adaptor fitting defining a conduit therein for passage of a wire from the wire feeder plate to the welding apparatus, wherein the adaptor fitting is disposed inside the housing when the adaptor cartridge is mounted to the housing.

28. The wire feeder according to claim 27, wherein the adaptor cartridge further comprises a control signal connector for the control signal connections.

29. The wire feeder according to claim 27, wherein the adaptor fitting provides the mechanical and the welding current connections.

30. A wire feeder comprising:

a housing defining an outer periphery;

an adaptor cartridge interchangeably mounted to the housing, the adaptor cartridge being recessed within the outer periphery of the housing and having mechanical, welding current, and control signal connections within the adaptor cartridge for operatively connecting a welding apparatus to the housing;

connectors for the connections, the connectors being fully recessed within the outer periphery of the housing;

wherein the adaptor cartridge includes a cartridge body having a front side and a rear side, the cartridge body defining an aperture having an inner profile, and an adapter fitting defining an outer profile, the outer profile configured to mate with the inner profile of the aperture through the cartridge body, and the adapter fitting defining a conduit, the adaptor fitting extending through the aperture at least from the front side to the rear side of the cartridge body, the conduit of the first adaptor fitting being configured to receive a welding wire therethrough.

* * * * *